US007353267B1

(12) United States Patent
Cunningham et al.

(10) Patent No.: US 7,353,267 B1
(45) Date of Patent: Apr. 1, 2008

(54) TARGETED NETWORK VIDEO DOWNLOAD INTERFACE

(75) Inventors: Ryan Cunningham, Westlake Village, CA (US); Robert Buch, Malibu, CA (US); Brian Hartman, Thousand Oaks, CA (US); Michael R. Jones, Jr., Thousand Oaks, CA (US); Laimonas Anusauskas, Westlake Village, CA (US)

(73) Assignee: NetZero, Inc., Woodland Hills, CA (US)

( * ) Notice: Subject to any disclaimer, the term of this patent is extended or adjusted under 35 U.S.C. 154(b) by 0 days.

(21) Appl. No.: 09/545,639

(22) Filed: Apr. 7, 2000

(51) Int. Cl.
*G06F 15/173* (2006.01)
(52) U.S. Cl. ..................... 709/224; 709/231
(58) Field of Classification Search ............... 709/223, 709/224, 229, 219, 225, 232, 231; 705/14, 705/54, 26, 27; 707/10; 725/42, 43, 32
See application file for complete search history.

(56) References Cited

U.S. PATENT DOCUMENTS 5,019,963 A   5/1991   Alderson (Continued)

FOREIGN PATENT DOCUMENTS

CA      2244002       7/1997

(Continued)

OTHER PUBLICATIONS

Brajnik, "A Shell for Developing Non-Monotonic User Modeling Systems," California Digital Library International Journal of Human-Computer Studies, vol. 40, No. 1, pp. 31-62, Jan. 1, 1994.

(Continued)

*Primary Examiner*—William Vaughn
*Assistant Examiner*—Joseph Maniwang
(74) *Attorney, Agent, or Firm*—SoCal IP Law Group LLP; Steven C. Sereboff; John E. Gunther

(57) ABSTRACT

A system provides a user with free Internet network access, in which an access control system sends video advertising files to a user who gains access to the Internet through a network connection that includes a viewer program that operates independently of the user's browser and e-mail programs. The viewer receives ads from the access control system and manages an ad pool that collects multiple video advertising files. Video advertising files are downloaded when the user is not actively using the bandwidth of the Internet connection to download Internet content of the user's choosing. The viewer program periodically opens a viewer window, which opens on top of any other open windows, and in which a video ad from the ad pool is displayed. When one or more video ads are finished, the viewer window is hidden or made an inactive window for a quiet interval. At the conclusion of the quiet interval, the viewer window is activated and the next ad in the ad pool is displayed. The viewer program cycles through existing ads in the ad pool until a new ad is received from the access server. The viewer program manages the ad pool such that the oldest ad is discarded when a new ad is received, and such that each ad is displayed or viewed in order of download for the average time it takes to download an ad in the ad pool. This ensures that ad viewing can continuously cycle through the ad pool with the minimum of repetition, and with no interruption to the user's Internet experience.

19 Claims, 21 Drawing Sheets

U.S. PATENT DOCUMENTS

| | | | |
|---|---|---|---|
| 5,105,184 A | 4/1992 | Pirani | |
| 5,305,195 A | 4/1994 | Murphy | |
| 5,319,455 A | 6/1994 | Hoarty | |
| 5,347,632 A | 9/1994 | Filepp | |
| 5,353,392 A | 10/1994 | Loquet | |
| 5,446,919 A | 8/1995 | Wilkins | |
| 5,504,675 A | 4/1996 | Cragun | |
| 5,572,643 A | 11/1996 | Judson | |
| 5,577,186 A * | 11/1996 | Mann et al. | 715/500.1 |
| 5,584,025 A | 12/1996 | Keithley | |
| 5,636,346 A | 6/1997 | Saxe | |
| 5,643,088 A | 7/1997 | Vaughn | |
| 5,717,923 A | 2/1998 | Dedrick | |
| 5,721,827 A | 2/1998 | Logan | |
| 5,724,521 A | 3/1998 | Dedrick | |
| 5,737,619 A * | 4/1998 | Judson | 715/500 |
| 5,740,549 A * | 4/1998 | Reilly et al. | 705/14 |
| 5,761,662 A | 6/1998 | Dasan | |
| 5,781,894 A | 7/1998 | Petrecca | |
| 5,794,210 A | 8/1998 | Goldhaber | |
| 5,809,242 A | 9/1998 | Shaw | |
| 5,818,512 A * | 10/1998 | Fuller | 725/82 |
| 5,823,879 A | 10/1998 | Goldberg | |
| 5,838,790 A | 11/1998 | McAuliffe | |
| 5,848,396 A * | 12/1998 | Gerace | 705/10 |
| 5,854,897 A * | 12/1998 | Radziewicz et al. | 709/224 |
| 5,913,040 A * | 6/1999 | Rakavy et al. | 709/232 |
| 5,918,014 A | 6/1999 | Robinson | |
| 5,933,811 A | 8/1999 | Angles | |
| 5,946,646 A | 8/1999 | Schena | |
| 5,946,664 A | 8/1999 | Ebisawa | |
| 5,948,061 A * | 9/1999 | Merriman et al. | 709/219 |
| 5,948,661 A | 9/1999 | Merriman | |
| 5,959,623 A | 9/1999 | van Hoff | |
| 5,974,451 A | 10/1999 | Simmons | |
| 6,009,409 A | 12/1999 | Adler | |
| 6,009,410 A | 12/1999 | LeMole | |
| 6,026,368 A | 2/2000 | Brown | |
| 6,036,601 A | 3/2000 | Heckel | |
| 6,055,513 A | 4/2000 | Katz | |
| 6,067,570 A | 5/2000 | Kreynin | |
| 6,085,229 A | 7/2000 | Newman | |
| 6,094,677 A * | 7/2000 | Capek et al. | 709/219 |
| 6,108,706 A * | 8/2000 | Birdwell et al. | 709/229 |
| 6,119,098 A * | 9/2000 | Guyot et al. | 705/14 |
| 6,128,601 A * | 10/2000 | Van Horne et al. | 705/34 |
| 6,141,010 A | 10/2000 | Hoyle | |
| 6,144,944 A * | 11/2000 | Kurtzman et al. | 705/14 |
| 6,151,600 A | 11/2000 | Dedrick | |
| 6,161,112 A * | 12/2000 | Cragun et al. | 715/501.1 |
| 6,169,542 B1 | 1/2001 | Hooks | |
| 6,216,112 B1 * | 4/2001 | Fuller et al. | 705/14 |
| 6,237,022 B1 * | 5/2001 | Bruck et al. | 709/201 |
| 6,240,091 B1 * | 5/2001 | Ginzboorg et al. | 370/401 |
| 6,285,987 B1 * | 9/2001 | Roth et al. | 705/27 |
| 6,310,873 B1 * | 10/2001 | Rainis et al. | 370/356 |
| 6,311,185 B1 * | 10/2001 | Markowitz et al. | 707/10 |
| 6,314,451 B1 * | 11/2001 | Landsman et al. | 709/203 |
| 6,336,098 B1 * | 1/2002 | Fortenberry et al. | 705/14 |
| 6,338,094 B1 | 1/2002 | Scott | |
| 6,389,469 B1 | 5/2002 | Vekslar | |
| 6,412,112 B1 * | 6/2002 | Barrett et al. | 725/152 |
| 6,463,468 B1 * | 10/2002 | Buch et al. | 709/219 |
| 6,487,538 B1 * | 11/2002 | Gupta et al. | 705/14 |
| 6,505,773 B1 * | 1/2003 | Palmer et al. | 235/380 |
| 6,609,146 B1 * | 8/2003 | Slotznick | 709/200 |
| 6,615,251 B1 * | 9/2003 | Klug et al. | 709/218 |
| 6,671,879 B1 * | 12/2003 | Schlarb et al. | 725/8 |
| 6,704,773 B1 * | 3/2004 | Cohn et al. | 709/217 |
| 6,807,558 B1 * | 10/2004 | Hassett et al. | 709/203 |
| 2003/0023488 A1 * | 1/2003 | Landsman et al. | 705/14 |

FOREIGN PATENT DOCUMENTS

| | | |
|---|---|---|
| CA | 2247325 | 9/1997 |
| CA | 2247330 | 9/1997 |
| EP | 0 811 942 A2 | 12/1997 |
| EP | 923036 | 12/1997 |
| EP | 0 822 535 A2 | 2/1998 |
| EP | 1 083 504 A2 | 3/2001 |
| GB | 2328537 | 11/1997 |
| JP | 3114348 | 5/1991 |
| WO | WO 97/21183 | 12/1995 |
| WO | WO 97/40601 | 4/1996 |
| WO | WO 97/07656 | 3/1997 |
| WO | WO97/27531 | 7/1997 |
| WO | WO 97/27531 | 7/1997 |
| WO | WO 07/32258 | 9/1997 |
| WO | WO97/32257 | 9/1997 |
| WO | WO 97/32257 | 9/1997 |
| WO | WO97/32258 | 9/1997 |
| WO | WO 97/40447 | 10/1997 |
| WO | WO97/43724 | 11/1997 |
| WO | WO 97/43724 | 11/1997 |
| WO | WO 97/46946 | 12/1997 |
| WO | WO97/46946 | 12/1997 |
| WO | WO98/35300 | 1/1998 |
| WO | WO 98/13761 | 4/1998 |
| WO | WO98/13761 | 4/1998 |
| WO | WO 98/35300 | 8/1998 |
| WO | WO 00/54201 | 9/2000 |
| WO | WO 00/75822 | 12/2000 |
| WO | WO 00/75850 | 12/2000 |
| WO | WO 01/04788 | 1/2001 |

OTHER PUBLICATIONS

Dedrick, Interactive Electronic Advertising, IEEE Multimedia 1994, 1994.

Dedrick, "A Consumption Model for Targeted Electronic Advertising," IEEE Multimedia, Summer 1995, pp. 41-49, Summer 1995.

Jennings, "A Personal News Service Based on a User Model Neural Network," Kansai Advanced Research Centre, Iwaoka, Japan, 1989-90.

Lieberman, "Letizia: An Agent that Assists Web Browsing," M.I.T. Media-Lab, Cambridge, MA, Aug. 1, 1995.

Robert Harrell, PCT International Preliminary Examination Report, Mar. 1, 2002.

* cited by examiner

1500

| BROWSER - DEMOGRAPHIC REPORT | — | ◻ | X |
|---|---|---|---|

FILE  EDIT  VIEW  TOOLS  HELP

BACK  FORWARD  RELOAD  HOME  PRINT  STOP

DEMOGRAPHIC REPORT FOR:
BROADCAST ENTERTAINMENT COMPANY

FIRST SHOW, AD1

DATA FOR: 1999 OCTOBER 1 TO PRESENT

START DATE ▽    END DATE ▽    VIEW OPTIONS

| IMPRESSIONS | UNIQUE IMPRESSIONS | CLICK THRU | RATE | COST |
|---|---|---|---|---|
| 710,000 | 400,000 | 500,000 | 0.60 | 42,600 |

SPECIAL EVENT, PROMOTIONAL AD

DATA FOR: 1999 NOVEMBER 1 TO PRESENT

START DATE    END DATE    VIEW OPTIONS

START

FIG. 21

| BROWSER - REPORT OPTIONS | — ☐ ✕ |
|---|---|

FILE   EDIT   VIEW   TOOLS   HELP

BACK   FORWARD   RELOAD   HOME   PRINT   STOP

FIRST SHOW, "AD1"                    [GRAPH DETAILS]

| IMPRESSIONS | UNIQUE IMPRESSIONS | CLICK-THRUS | RATE | COST |
|---|---|---|---|---|
| 710,000 | 400,000 | 500,000 | 0.60 | 42,600 |

☒ AGE GROUPS        ☒ 13-17     ☒ 18-24        ☒ 25-34

☒ GENDER            ☒ MALE                     ☒ FEMALE

☒ INCOME            ☒ $0-25K    ☒ $26K-50K ☒ $51-

☒ OCCUPATION        ☒ ACCOUNTING  ☒ COMPUTERS

☒ GEOGRAPHIC        [ALL STATES ▼]

☒ INTERESTS         [GAMING ▼]

[START]

FIG. 22

BROWSER - GRAPH DETAILS

FILE   EDIT   VIEW   TOOLS   HELP

BACK   FORWARD   RELOAD   HOME   PRINT   STOP

FIRST SHOW, "AD1"

| AGE GROUPS | IMPRESSIONS | CLICK-THRUS | IMP-CT% |
|---|---|---|---|
| 13-17 | 180,000 | 150,000 | 83% |
| 18-25 | 200,000 | 170,000 | 85% |
| 26-34 | 160,000 | 100,000 | 62.5% |
| 35-45 | 100,000 | 50,000 | 50% |
| 45-55 | 50,000 | 20,000 | 40% |
| 56-65+ | 20,000 | 10,000 | 50% |

| GENDER | IMPRESSIONS | CLICK-THRUS | IMP-CT% |
|---|---|---|---|
| MALE | 391,500 | 295,000 | 75% |
| FEMALE | 318,500 | 205,000 | 64% |

START

FIG. 23

| BROWSER - ARCHIVE | — □ X |

FILE   EDIT   VIEW   TOOLS   HELP

BACK   FORWARD   RELOAD   HOME   PRINT   STOP

FIRST SHOW, AD1

CHOOSE DATES TO REVIEW

START DATE

| JULY ▽ |   | 20 ▽ |   | JULY ▽ |   | 26 ▽ |

VIEW REPORT

SPECIAL EVENT, PROMOTIONAL AD

CHOOSE DATES TO REVIEW

START DATE

| JUNE ▽ |   | 16 ▽ |   | JULY ▽ |   | 26 ▽ |

START

FIG. 24

TARGETED NETWORK VIDEO DOWNLOAD INTERFACE

BACKGROUND OF THE INVENTION

1. Field of the Invention

This invention relates generally to network access schemes and, more particularly, to an interface for targeted network video download.

2. Description of the Related Art

The early beginnings of the network commonly referred to as "the Internet" involved scientists, researchers, and technology experts exchanging information over a secure computer network. Now, the Internet is fast becoming popular with the general populace not just for information exchange, but also for entertainment and recreation. Users can access thousands of files stored in computers that comprise Internet sites that contain text, graphics, video, and audio content by using graphical user interface (GUI) computer browser programs that navigate the collection of such sites commonly called the "world wide web".

For the typical home user, access to the Internet is gained by connecting their computer to an Internet service provider (ISP) through a telephone line, although other connection services are gaining popularity. In most cases where a home user has an ISP, the user pays a fee to the ISP in exchange for access to the Internet through the ISP. The connection from the user computer to the ISP can be virtually any type of network access, such as typical analog telephone line access through a local exchange carrier or telephone company. Other connection services include cable modem services and Digital Subscriber Line (DSL) services.

For typical telephone connections, a modem is connected between the user computer and the telephone line, to provide an interface between the digital data used by the computer and the analog signal transmitted over the telephone line. The user uses a dial-up connection utility program to connect the user computer to the ISP system via the modem. At the ISP, a modem converts the transmitted analog signal back to computer data. An ISP will usually have several telephone numbers available in a user's local calling area for a dial-up connection. Such a connection system can provide data exchange rates of 36K bytes per second upload (computer user to ISP) and up to 56K bytes per second download (ISP to computer user). The connection from the ISP to the Internet "back bone" is typically over relatively expensive, high-speed digital lines such as fiber optic cable over T1 or T3 connections that can provide data exchange rates of 1 M bytes per second or greater.

Recently, Internet service companies have begun to provide Internet content to users based on the broadcast television model of content delivery. That is, Internet content is delivered to users for no charge, in exchange for the content being delivered with banner display advertising materials, which are observed by the users. The companies who provide the advertising materials pay fees to the Internet content providers, the ISPs, for the advertising exposure in the hope that it will keep their products and services uppermost in user's minds and will influence purchasing decisions. The fees paid by advertisers are typically a function of click-through rate, which is the rate of ad viewers (users) who visit the advertiser's web site from the banner ad.

The Internet advertising typically consists of images that take up a portion of a user's browser window on the computer display screen, so-called "banner" advertising. The banner advertising leaves most of the browser window free for viewing, and typically places the banner across a top area of the window. A typical Internet access-for-advertising arrangement uses a dial-up connection that continuously downloads a banner ad from the ISP while the user is connected. That is, as soon as the user's browser or viewer program is ready for a new banner ad, a new banner ad is downloaded from an ad server. The download may or may not interfere with the user's Internet activity.

Because the banner advertising occupies a relatively small area of the user's display window, the advertising does not preempt viewing of Internet content. Thus, banner advertising does not intrude on the user's Internet experience, but because it is static, it unfortunately can rather easily be ignored by the user. This is unlike the model of broadcast television, which generally ensures that no other display interruption will occur during the viewing of advertising content. Moreover, banner advertising does nothing to catch the attention of the user, and this reduces the likelihood that a user will take the time to view the banner advertising, and reduces its effectiveness.

Video images, comprising data files that provide full-motion video displays, can be viewed over the Internet. Video files are desirable for providing a moving image display with audio, which will more likely attract and hold a viewer's interest. Video files, however, are relatively large and can take an inordinate amount of time to download. Banner ads may require 5K to 25K bytes of data, but a video file of 30 seconds duration may require 1.3 M bytes of data, even with data compression techniques. As noted above, banner ads are sufficiently small that they may be downloaded without notice by a user while the user is viewing Internet content. In contrast, video files are so large that a user's Internet viewing almost certainly would be interrupted while the large file was being downloaded. Hence, video files are not conducive to the access-for-advertising, broadcast television model of providing Internet access.

Compounding the greater amount of time necessary to download video files is the problem of variety and staleness. Viewers can quickly become familiar with Internet video advertising images, just as with television commercials in the broadcast context. Experience is showing that the Internet user has a short attention span. Therefore, it is important to provide the Internet user with a variety of advertising that is constantly refreshed. If video advertising is to be useful for the Internet, then it is important to provide a variety of video files, notwithstanding the fact that such files take longer to download. With these conflicting ideals, it can be seen that video advertising is not currently practical in the access-for-advertising model of Internet access, because they take a greater amount of time to download than banner advertising, and they must be refreshed frequently to avoid becoming stale.

In addition, most Internet advertising is indiscriminately directed. That is, banner ads are sent to users without regard to the demographic profile of individual users. Typically, access providers can charge higher rates if they can ensure a target viewing audience with a particular demographic profile.

Alternatively, advertising may be directed to a user based on that user's network browsing habits. For example, some advertisers may monitor the banner ads to which a user responds with a "click-through". These user click-throughs may be collected into a database that can be used to direct future banner ads. Unfortunately, directing advertising in this manner takes time to accumulate, is not very precise, and only reflects past user browser history. Thus, a user's present demographic profile is not necessarily reflected in the database and ineffective or inappropriate advertising may still be directed to the user.

From the discussion above, it should be apparent that there is a need for an Internet access-for-advertising technique that provides Internet content to targeted users along with video advertising that will more likely hold the interest and attention of Internet users and also ensures a fresh supply of video files, without interrupting the Internet experience of the user. The present invention fulfills this need.

SUMMARY OF THE INVENTION

The present invention provides a technique for providing free computer user access to a network, in which an access control system sends video advertising files to a user who gains network access through a network connection process that includes a file viewer program operating independently of the user's network application programs. In the case of Internet access, the network applications may include browser and e-mail programs. The user receives advertising files from the access control system and the viewer program collects them into an ad pool stored in the user's computer. Video advertising files are downloaded when the user is not actively using the bandwidth of the network connection to download content through the network application programs. The viewer program periodically opens a viewer window, which opens on top of any other open user application windows, and in which an ad from the ad pool is displayed. When one or more video ads are finished, the viewer window is hidden or made an inactive window for a quiet interval. At the conclusion of the quiet interval, the viewer window is activated and the next ad in the ad pool is displayed. The viewer program manages the ad pool such that ad files are not viewed after they have reached a predetermined play limit, thereby determining that new ad files are needed. New ad files are then received over the network connection during access, preferably such that each ad is displayed or viewed for not less than the time it takes the ad to be downloaded. This ensures that the ad pool is managed so as to maximize the amount of advertising to which the user will be exposed while minimizing the impact of downloading on the user's network access experience. In this way, the invention keeps the ad pool fresh within a predetermined ad pool size, and provides network access to users for no charge or fee, and also ensures a fresh supply of video advertising files that will more likely hold the interest and attention of the computer user.

In one aspect of the invention, user demographic information is collected from each user and is utilized to direct video ad files to targeted users according to their demographic information. In another aspect of the invention, the viewer program provides fraud detection features to ensure that users do not disable the viewer program. In this way, advertisers can be confident that their video ads will be viewed by the intended audience. In another aspect of the invention for Internet access, users are provided with a link window that permits users to select a web site that corresponds to one of the video ads in the ad pool. Selecting the web site of a video ad sponsor results in the user's browser receiving content from the sponsor's web site.

Other features and advantages of the present invention should be apparent from the following description of the preferred embodiment, which illustrates, by way of example, the principles of the invention.

BRIEF DESCRIPTION OF THE DRAWINGS

FIG. 21 is a Demographic Report page that is displayed at a user computer for a user who is a sponsor of the access service.

FIG. 22 is a Report Data browser display page that is displayed at a user computer in the FIG. 1 system for a user who is a sponsor of the access service.

FIG. 23 is a Report Data Graph browser display page that is displayed at a user computer in the FIG. 1 system for a user who is a sponsor of the access service.

FIG. 24 is a Report Data Archive browser display page that is displayed at a user computer for a user in the FIG. 1 system who is a sponsor of the access service.

DESCRIPTION OF THE PREFERRED EMBODIMENTS

Figure 1:
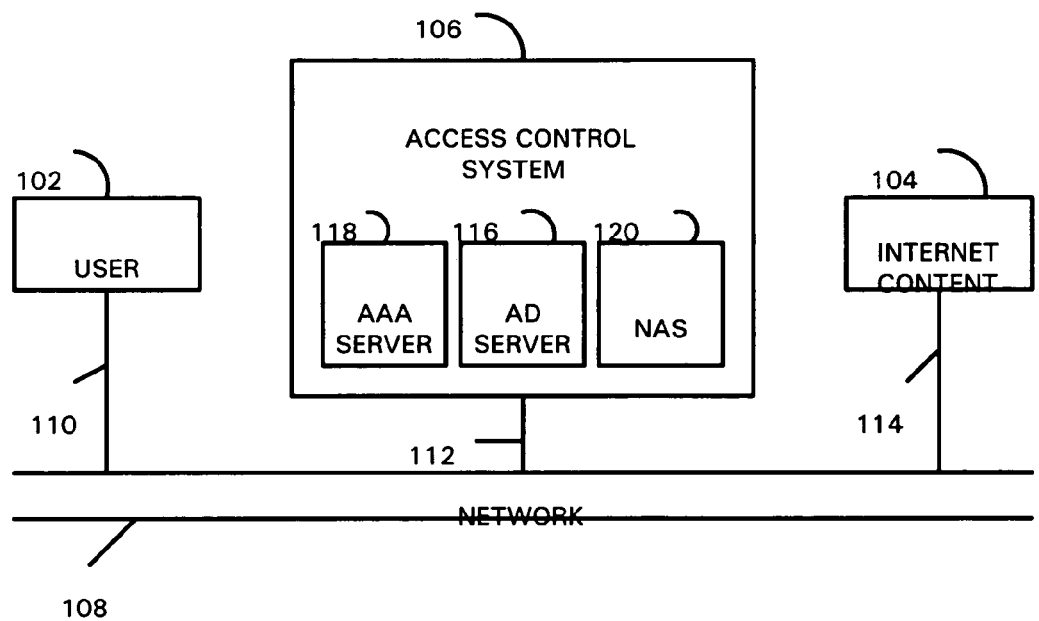
FIG. 1 is a representation of a system that provides Internet access in accordance with the present invention.

FIG. 1 is a representation of a system 100 that provides Internet access in accordance with the present invention. A user computer 102 gains access to Internet content from servers 104 through an access control system 106 that provides video advertising files. Requests from users 102 for service, receipt of Internet content, and communication with the access control system 106 all take place over a network 108 that includes conventional telephone lines and high-speed digital access lines, collectively referred to as the Internet. The Internet content that can be received includes e-mail, ftp files, "World Wide Web" content, chat services, and all other content available through the Internet. Thus, the user 102 is connected via a network connection line 110 that typically is a conventional analog telephone line. Similarly, the access control system 106 is connected to the Internet via a connection 112 and the Internet content servers 104 are connected via a connection 114. The access control and content connections 112, 114 are typically high-speed digital lines.

In the preferred embodiment, the access control system 106 includes a Network Access Server (NAS) 116, an Access, Authorization, and Accounting (AAA) server 118, and an Advertising file (Ad) server 120. The NAS identifies dial-up network connections initiated by users and assigns Internet protocol (IP) addresses to the user connections, taking the IP addresses from a pool of available IP addresses established by the service provider. The AAA server 118 communicates with a standard protocol, such as commonly referred to as Remote Authentication Dial-In Service (RADIUS) or Terminal Access Controller Access Control System (TACACS), or the "TACACS+" system from Cisco Systems, Inc. of San Jose, Calif., USA. Other means of access authorization can be readily implemented by those skilled in the art.

In the preferred embodiment, the AAA server 118 authorizes each user to have access to the network 108 and performs various accounting functions to maintain a record of users who have logged onto the network and at what time, as well as other functions such as loading specific network profile information. One such network profile information, for example, is referred to as Virtual Private Dial Network (VPDN) information. The accounting function includes keeping track of each user's logon time and logoff time, for every online communications session. The Ad server 120 provides ad files and communicates with the AAA server 118 to deny a user access if fraud is detected in connection with that user. Fraud detection is described in greater detail below. In the preferred embodiment, each of the Network Access Server 116, AAA server 118, and Ad server 120 comprise a separate, independent server computer. This provides the greatest reliability, responsiveness, and user accommodation. It should be understood, however, that the functionality of all three may be provided in a single machine. The functionality of all three servers 116, 118, 120 will be referred to collectively as the "communications server".

In a system where a user 102 will connect to the Internet through a dial-up connection over an analog telephone line, the user will launch a dial-up connection program that causes the user computer to contact the AAA server 118. The AAA server receives identification information from the user and authenticates that user for permission to receive Internet access. If desired, the AAA server may access accounting and compliance records to check for detected usage fraud and the like. If permission is indicated, then the AAA server provides an approval signal to the NAS server 116, which permits the user to have access to the Internet. Thus, the Access Control System 106 functions as an Internet Service Provider (ISP). The ISP may revoke a user's access by removing the user's account information from the AAA server because of previously detected fraud.

In accordance with the invention, a user 102 receives ads from the communications server 106. A viewer program installed at the user maintains a user ad pool in which video advertising files are collected. Each video advertising file contains sufficient data to provide a video "program" that typically has a run time of between thirty seconds and 2.5 minutes. It should be understood that faster connections and download technologies could be used to increase the program length without affecting the user's access.

Figure 2:
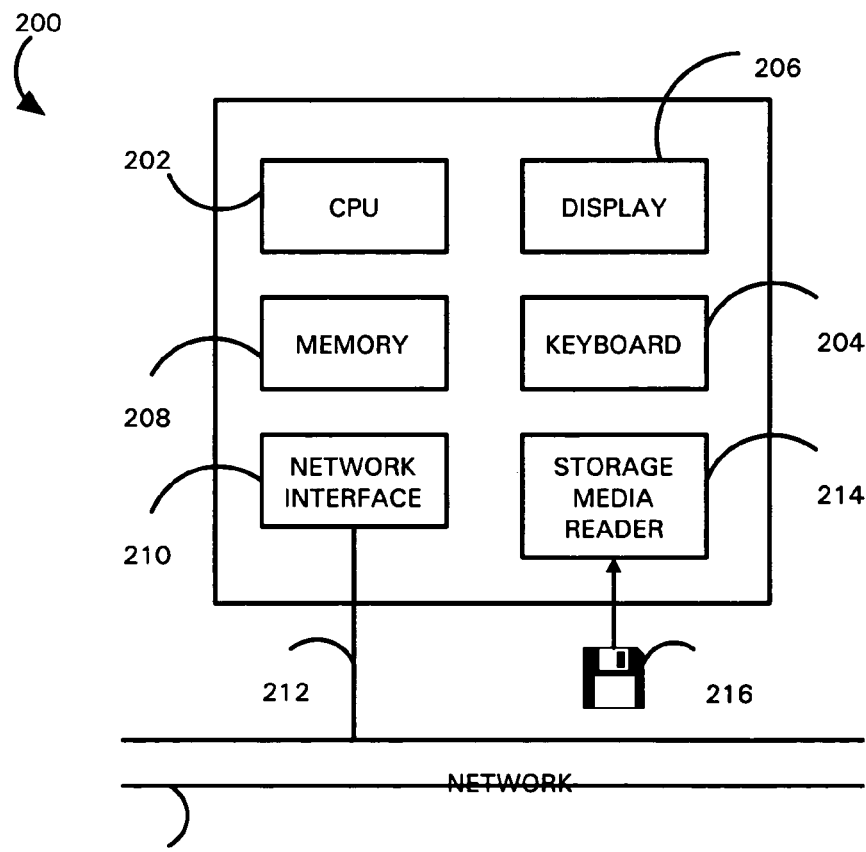
FIG. 2 is a representation of a computer of the FIG. 1 system.

Those skilled in the art will appreciate that the Internet content servers 104 comprise multiple file servers at which web site files are stored. Those skilled in the art also will appreciate that the user computer 102, access control system 106 computers, and Internet content servers 104 can all have a similar computer construction. FIG. 2 is a block diagram of an exemplary computer 200 such as might comprise any of the computers 102, 104, 106. Each computer 200 operates under control of a central processor unit (CPU) 202, such as a "Pentium" microprocessor and associated integrated circuit chips, available from Intel Corporation. A user can input commands and data from a keyboard 204 and can view inputs and computer output at a display 206. The display is typically a video monitor or flat panel display. The CPU 202 operates under control of programming steps that are stored, temporarily, in memory 208 of the computer. Each computer communicates with the Internet 108 through a network interface 210 that enables communication over a connection 212 between the network 108 and the computer 200. The computer also can receive computer instructions, or data, from a storage media reader 214. The storage media reader 214 receives storage media 216 from which it can read stored information. That is, the storage media can contain program steps that are executed by the CPU to perform a method for providing Internet access as described above. The storage media thereby comprises a program product that embodies a storage media that is received by the storage media reader.

To provide user access in accordance with the invention, a viewer program is installed at the user computer 102 to make it act as a client with respect to the communications server 106. The viewer client program manages the ad files and may comprise a viewer client with the required functionality, or may comprise a targeted viewer client that is capable of greater functionality.

In one aspect of the invention, a viewer client program at the user 102 manages the ad pool such that the oldest ad is discarded when a new ad is received, and such that the expected or average time to download an ad file is approximately equal to the total time an ad is displayed from the ad pool. For example, if each ad in the ad pool has a 30-second playing time, and if the average download time for an ad file is expected to be fifteen minutes, then each 30-second ad should be played thirty times before the ad is cycled out of the ad pool. In this way, any single ad should have fifteen minutes of total display time before deletion. Thus, the ads are shown from the ad pool so that download time is averaged to be approximately equal to the total display time.

As described further below, a "quiet interval" during which no ads are shown can be used to automatically reduce the number of times an ad would otherwise be shown. More particularly, given the 15-minute download time and the corresponding 15-minute display time described above, it may be desirable to provide a portion of the display time as a "quiet interval" during which the user will see no ads, but during which ads will continue to be downloaded. A ratio of 1:5 may be used, so that 2.5 minutes of ad display will be followed by 12.5 minutes of no display. When a new ad is downloaded, the oldest ad will still be deleted. Thus, in the example above, an ad in a system with a 12.5 minute quite interval will be shown five times (during the 2.5 minute display interval) rather than thirty times.

In the viewer client of the preferred embodiment, an initial ad pool of ad files is downloaded or otherwise installed with the viewer program at the user computer before the user can utilize the Internet access system and viewer program. Thereafter, an expected Internet connection speed is assumed such that ad files can be continuously downloaded during the user's Internet access, and an ad file should complete downloading approximately when the oldest ad file in the ad file pool will have been played the appropriate number of times. For example, using a 28.8K band modem, a 30-second video clip using conventional technology can generally be downloaded in no more than fifteen minutes of a user's Internet access time.

More particularly, the expected average ad file download time sets the number of plays for each ad before it should be cycled out of the ad pool. For example, if the Internet connection speed (baud rate) of the user's network connection 110 is such that an ad of typical size requires fifteen minutes to download, then the number of plays for each thirty-second ad before cycling out (in accordance with the example given above) should be thirty. Such a connection speed may be provided, for example, by a 28.8K baud modem. Accordingly, the ad pool will be initially stocked so that, after a sufficient total time of Internet access by the user to provide for fifteen minutes download of a new ad file, the oldest thirty-second ad in the ad pool should have been played thirty times. Setting the system design of the client viewer program in this way minimizes the amount of operational sophistication needed by the viewer program for proper management of the ad pool, so that no tracking of individual ad files is necessary. If the speed of the Internet connection is faster than 28.8K, or if the bandwidth otherwise improves, ads of greater size may be downloaded to preserve the fifteen minute average download time.

Video advertising files are downloaded when the system detects that the user is not actively using the bandwidth of the user's Internet connection 110 to download Internet content. During the time a user is connected to the Internet via the access control system 106, the viewer program is continuously running, and periodically opens a viewer window that is placed on top of any other active window and in which an ad from the ad pool is displayed. When the video ad is finished displaying, the viewer window is closed for a quiet interval. At the conclusion of the quiet interval, the viewer window is opened and the next ad in the ad pool is displayed. The viewer program cycles through existing ads in the ad pool until a new ad is received from the communications server.

Figure 3:
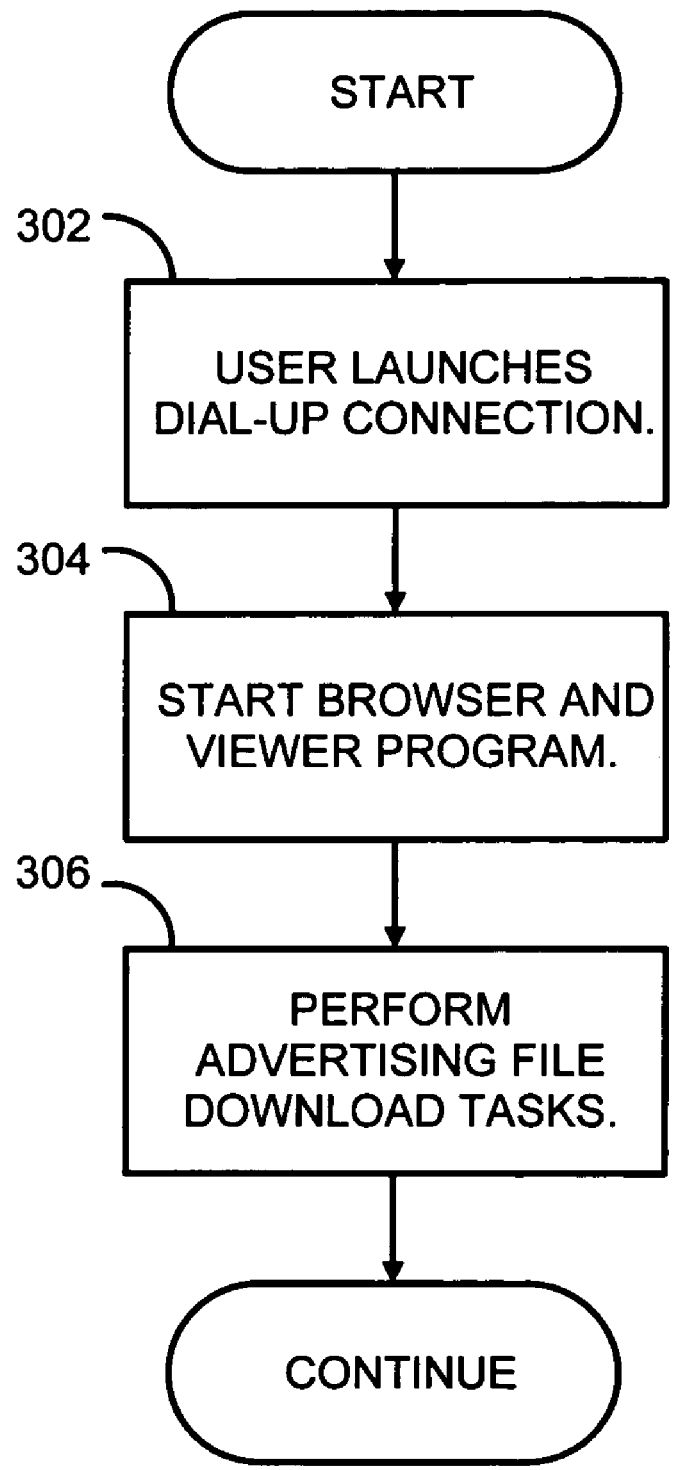
FIG. 3 is a flow diagram that illustrates the processing steps executed by the computer processing system of FIG. 1 to implement the Internet access technique in accordance with the present invention.

FIG. 3 is a flow diagram that illustrates the processing steps executed by the computer processing system 100 of FIG. 1 to implement the Internet access technique in accordance with the present invention. In the first step, represented by the FIG. 3 flow diagram box numbered 302, the user launches an Internet access program constructed in accordance with the invention that causes launch of the dial-up connection program, which will dial a prescribed telephone access number for the ISP. In any of the embodiment described herein, communication may be established using a wired or wireless broadband connection, such as a cable modem, ISDN or DSL.

In the next step, after establishing communication, the system starts the viewer program. A browser program is preferably started as well, to display a predetermined web page such as the home page of the Internet access provider. The operating system of the user's computer will launch the appropriate Internet browser application, and the dial-up connection program for the no-charge ISP will start the viewer application program. This processing is represented by the flow diagram box numbered 304. Next, after the browser and viewer have been launched, the system performs ad file download tasks and ad pool management, as described further below. This processing is represented by the FIG. 3 flow diagram box numbered 306.

Figure 4:
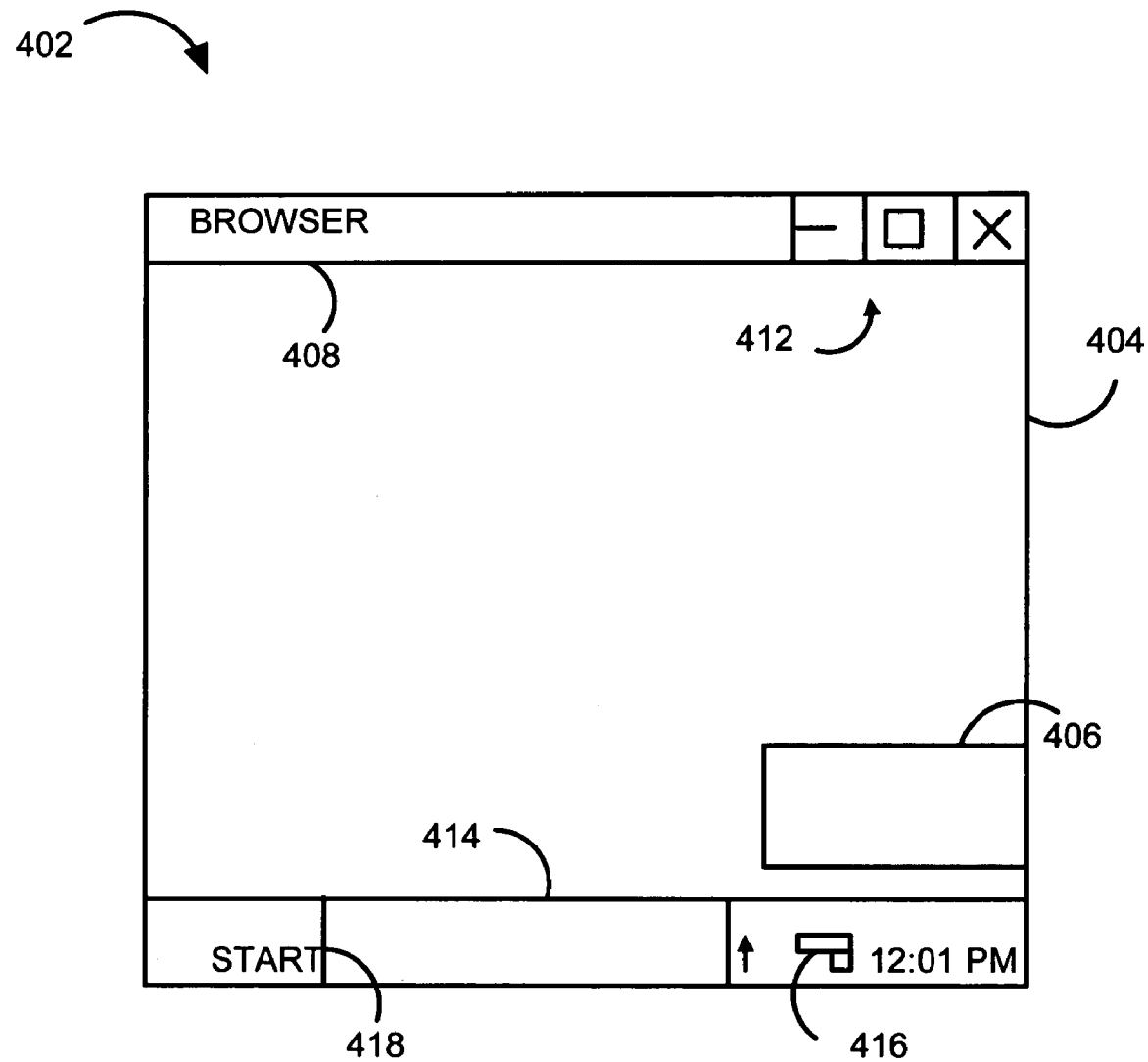
FIG. 4 is a representation of the display viewed by a user at the computer illustrated in FIG. 2.

FIG. 4 is a representation of the display window 402 viewed by a user at the computer illustrated in FIG. 2, showing a browser application window 404 with a viewer window 406 in the lower right corner of the display window. The browser window contains display artifacts that should be familiar to those skilled in the art, including a menu bar 408 with title, window sizing icons 412, and a tray 414 of the display window that includes an icon 416 for the viewer program. The "START" icon 418 provides access to a variety of operating system commands and will be familiar to those skilled in the art. Although the display 402 shows a configuration typical for an operating system such as "Windows 98" by Microsoft Corporation, it should be understood that the viewer program also can be interfaced with other computer operating systems, such as the "Macintosh" operating system by Apple Computer Corporation and the various UNIX variants that are available.

Figure 5:
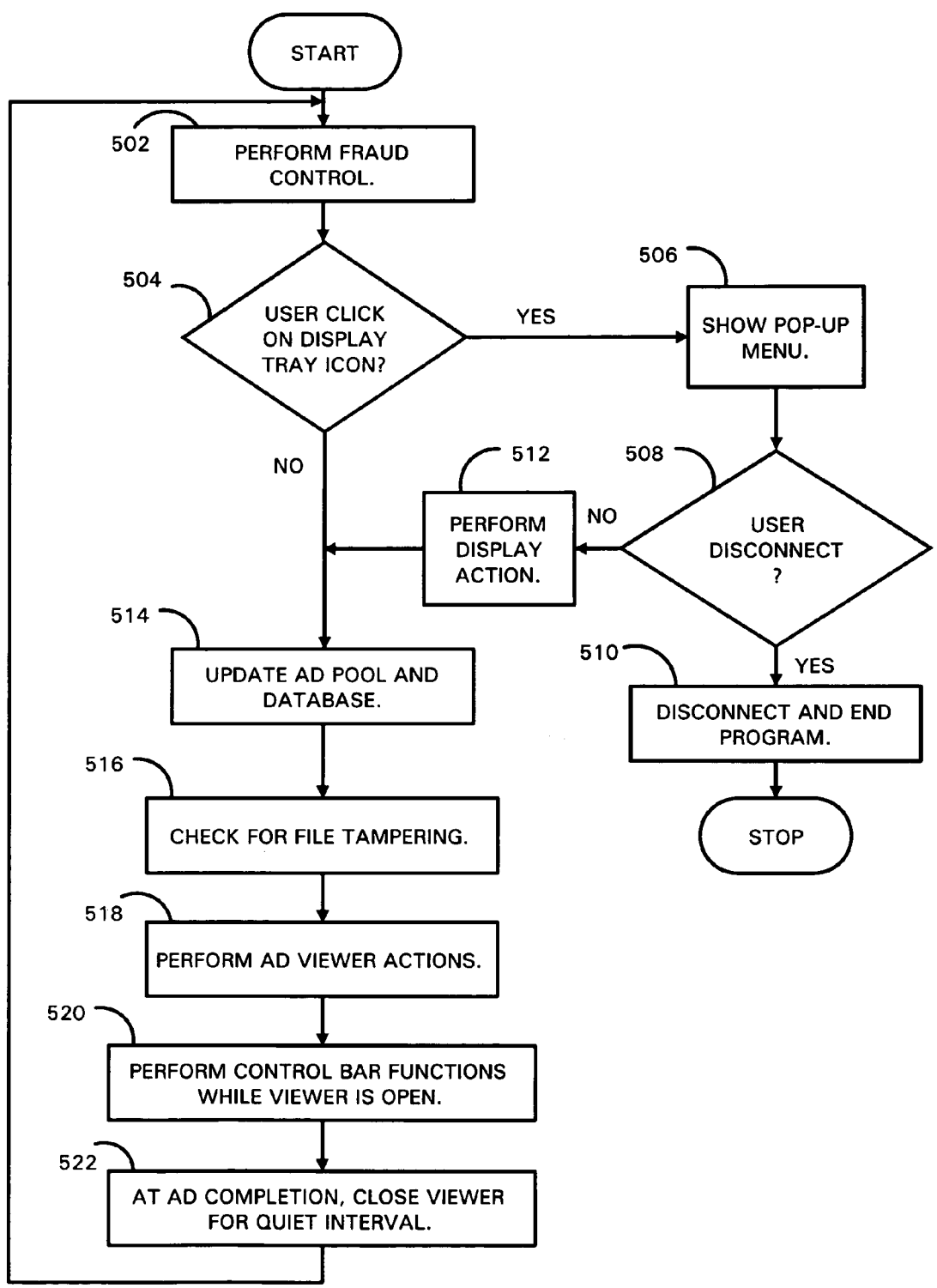
FIG. 5 is a flow diagram that illustrates the processing steps performed by the system illustrated in FIG. 1 in providing Internet access.

FIG. 5 is a flow diagram that illustrates the processing steps performed by the system 100 illustrated in FIG. 1 in providing Internet access to a user without charge, after the user first launches the dial-up connection program and establishes communication with the access control system and, in particular, the Ad server, as indicated in box 302 of FIG. 3. Those skilled in the art will understand that a user may, at any time, halt operation of the free access program by losing a line connection or terminating the connection with the user's operating system. The first step indicated in FIG. 5 following establishment of communications is to perform fraud control. This is of critical importance because advertising sponsors, who are being asked to pay the operating costs of the access server, will only be willing to pay costs if they have reasonable assurances that users are, in fact, viewing the video ads. The fraud control step 502 provides this assurance.

In particular, the fraud control step 502 involves sending a "Pulse" message to the Ad server. The fraud Pulse message is sent at regular intervals and contains a user identification number (user ID) and a date and time indication. If the Ad server does not receive a Pulse message from a user when such a message is expected, then the Ad server will terminate the communications session with the user. This can be done, for example, by the Ad Server sending a termination message to the viewer program to terminate, or to the NAS to deactivate the user's IP address. Other means of terminating access upon command by the Ad server are also suitable. A predetermined interval of, for example, five minutes should be sufficient to ensure that users are not attempting to bypass ad viewing. Thus, if the Ad server does not receive a Pulse message once every five minutes, communication will be terminated. The fraud interval may be set as desired.

Fraud control can be implemented using an encryption method for network authentication rather than the Pulse message and disconnection technique described above. Such a fraud control system might be implemented with a custom authentication server and custom authentication protocols. In addition, a number of standard, commercially available authentication servers can be used with an encryption technique that keeps an access name and password hidden from the user. In this way, a user would not be permitted to complete the log-on process without using the supplied fraud control program to make the network connection. This would ensure that the supplied fraud control program runs on the user machine as a requirement of permitting Internet access, and is preferred where maximum fraud security is desired.

In the next step of operation, represented by the FIG. 5 decision box numbered 504, the dial-up connection program results in a viewer icon located in the display tray (see FIG. 4), and the viewer program thereafter checks to determine if the user has clicked on the display tray icon. If the user has clicked on the icon, an affirmative outcome at the decision box 504, then a pop-up menu is displayed, as indicated at box 506. The pop-up menu permits the user to view parameters and actions. For example, the pop-up menu may show items including "Disconnect", "Settings", and "Help". The user may select any one of these three alternatives. It should be noted that a "Dial-Up Networking" icon may be automatically placed in the display tray by the computer operating system. Those skilled in the art will understand that the Internet connection also can be terminated by the user through the Dial-Up Networking icon.

User selection of "Disconnect" is indicated as an affirmative outcome at the FIG. 5 decision box numbered 508. If the user selects "Disconnect" from the pop-up menu, then at box 510 the dial-up program is halted and the user is disconnected from the Internet, ending the session. If "Disconnect" is not selected, a negative outcome at the decision box 508, then at box 512 the system performs the display action associated with the action. For example, the resulting actions if "Help" is selected include display of the "help" menu. Those skilled in the art will be able to determine the set of topics that would be helpful to users and should therefore be included in the help menu. If the user selects "Settings" from the pop-up menu, then a dialog box will be shown that will contain program operating parameters. The user may want to change the display time options. For example, the user may select between seeing ads for 30 seconds every three minutes, and seeing 2.5 minutes straight viewing time of ads every 15 minutes.

If the user clicks on a display icon (box 506) and then performs a display action (box 512), or if the user does not click on the display tray icon (a negative outcome at the decision box numbered 504), then the next operation step is the same, as indicated at the box numbered 514: update the ad pool and database. Such update actions involve the viewer program removing the oldest ad in the ad pool if a new ad has been successfully downloaded. Any local databases are updated with ad file information from the Ad server, such as the new ad name, ad ID, product, sponsor company, ad file name, path, and size. In the preferred embodiment, the local database is kept secure from access by the user. After the ad pool update action, the system next checks for file tampering at the flow diagram box numbered 516.

To detect tampering, the system checks for a match between ad file information in the secure local database and actual ad file information. The local database is maintained by receiving ad file information along with a new ad file. The received ad file information includes, for example, file name, path, file size, creation date, and the like. For example, each ad in the ad pool will have a file size specified by received ad file information in the secure database. The operating system of the user computer can determine the actual block size of the file. Other file parameters may be checked for changes. If there is a discrepancy, a mismatch-indicating message is sent to the Ad server with the user ID and the date and time of detected discrepancy. The Ad server records the fact that the viewer sent a mismatch message, an indication that possible fraud has occurred. The viewer program then displays a fraud message on the viewer's computer. Preferably, the fraud message indicates that fraud has been detected and that such fraud comprises a violation of the usage agreement. The message can request that the user contact the ISP, or some other corrective or remedial action may be suggested. The dial-up connection program is then terminated and user access is halted. Thus, the fraud detection ensures that the file entries in the local database match the entries expected by the authorization server. This ensures that the user has not tampered with the files.

If no fraud is detected, the user continues to be provided with Internet access. The next processing step, at the flow diagram box numbered 518, is to perform ad viewer actions. The ad viewer actions comprise the automatic processing by the viewer program to periodically display video ads from the ad pool. The ad viewer actions are described further below in conjunction with FIG. 6. Next, during ad showing, the viewer program detects when the display cursor is placed over the viewer window. When the cursor is over the viewer window, the viewer program causes the viewer control bar to be displayed and any user control bar actions to be performed, as indicated by the flow diagram box numbered 520. The viewer program performs the control bar functions and thereby provides a means for the user to manage the window in which the ads are viewed. The control bar function processing is described further below in conjunction with FIGS. 7, 8, and 9.

At the completion of each video ad, a "play completion" message is sent to the Ad server. This ensures that the server has the most current information available on ad viewing. One or more ad viewings comprise an ad showing interval, depending on the implementation. When the ad showing interval is completed, the viewer program hides the viewer window and enforces a quiet interval during which no ads are shown. This processing is represented by the flow diagram box numbered 522. The viewer program then enforces the quiet interval, and processing control returns to the fraud control operation represented by the FIG. 5 flow diagram box numbered 502.

Figure 6:
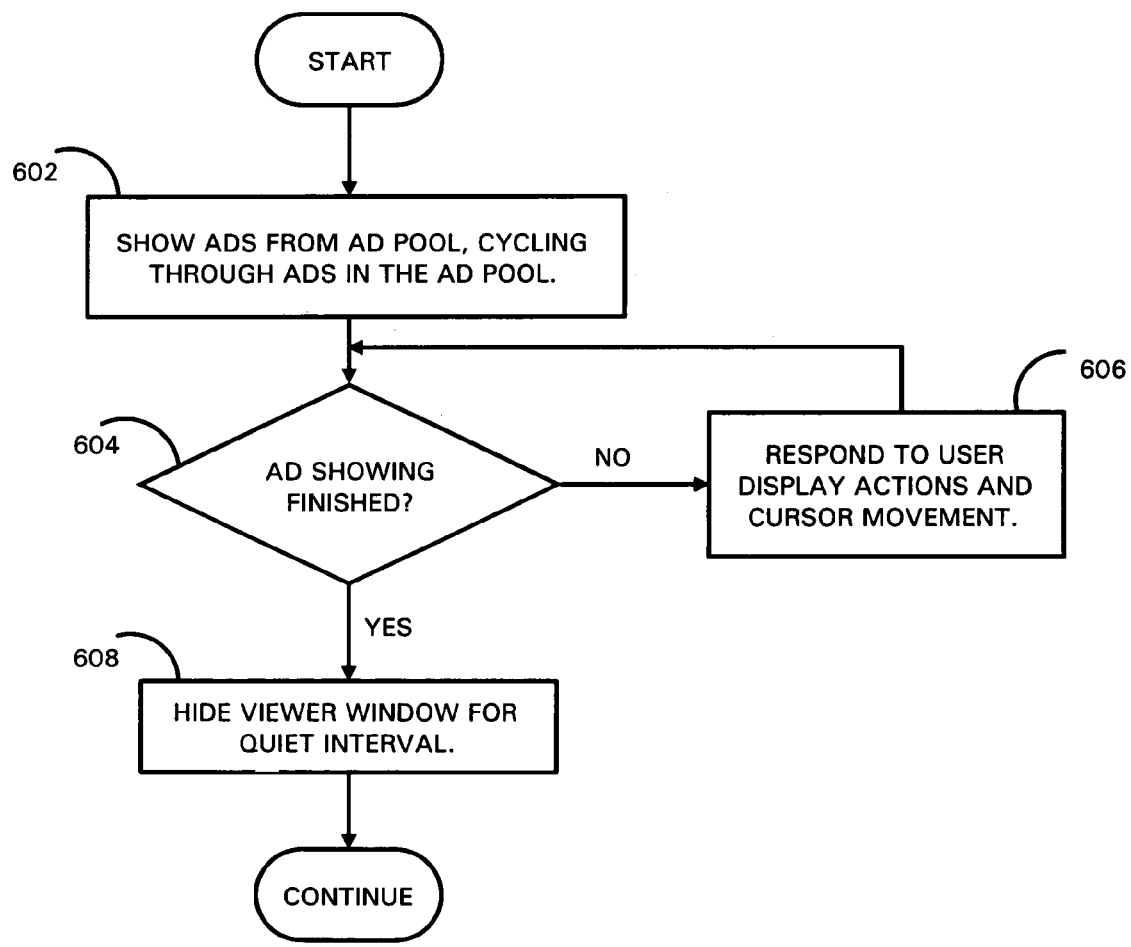
FIG. 6 is a flow diagram that illustrates the processing steps performed by the system illustrated in FIG. 1 in managing the playback of video ads.

Further details of the viewer program operation during ad showing are illustrated in the FIG. 6 flow diagram. As indicated by the FIG. 6 flow diagram box numbered 602, the viewer program first shows ads from the ad pool stored in the user's computer. The viewer program keeps track of the order in which the ads should be shown, such as by keeping an ad information table of the local database in the computer memory, to cycle through the ads in the ad pool in proper viewing sequence. As noted above, the ads are shown in order of download, from oldest to newest, and each time a new ad is downloaded, the viewer program deletes the oldest ad from the ad pool. Also as noted above, a "play completion" message is sent after completion of each ad showing. The play completion message includes the user ID, ad name or ID, and the date and time of completion. If the Ad server is not available to receive and acknowledge the play completion message, then the play completion message is temporarily stored in the viewer program message queue. This is part of the processing in box 602.

In the next viewer program operating step, represented by the decision box numbered 604, the program checks to determine if the ad showing interval has completed. As noted above, the viewer program opens or launches the viewer window at regular intervals, showing ads for a predetermined time interval and then hiding the viewer window or making it inactive. The viewer window runs on top of any other open window and provides a picture-in-picture viewing format. For example, in the preferred embodiment, the viewer program shows 2.5 minutes of ads in the viewer window, cycling through ad pool files that each provide a 30-second video presentation. Thus, five consecutive ads will be shown during an ad showing interval. After the 2.5 minute ad showing interval, the viewer program implements a 12.5 minute quiet interval during which the viewer window is hidden or made inactive. Other intervals may be selected, depending on programming needs. Alternatively, each ad showing may comprise an ad showing interval, so that a 15-minute period still will include a total of 2.5 minutes of ad viewing. That is, a 30-second viewing interval will be followed by a 2.5 minute quiet interval.

If the ad showing interval is not completed, a negative outcome at the decision box 604, then the viewer program detects and responds to any user display actions and cursor movement, as represented by the flow diagram box numbered 606. If the ad showing interval is complete, a positive outcome at the decision box numbered 604, then the viewer window is hidden or made inactive for the duration of the quiet interval. System processing then continues.

As noted above for the FIG. 5 box numbered 520, the viewer program detects when a user moves the cursor over the viewer window, and as described above for the FIG. 6 box numbered 606, the viewer program responds to such viewer display actions. Those skilled in the art will be familiar with how the viewer program can be programmed to obtain such information from the computer operating system. Moving the cursor over the viewing window display area and clicking on the ad being shown causes the viewer program to direct the user's browser to the web site associated with the ad (according to a URL stored in the local database) and sends an "ad click" message to the Ad server with user information such as user ID, ad ID, and date and time of click. If the Ad server is not available to receive and acknowledge the ad click message, then the ad click message is temporarily stored in a message queue of the viewer program for later sending. Other messages may also be stored in the message queue, except that only one "Pulse" message described above, which confirms a user connection, should be permitted in the queue, to prevent the Ad server from being flooded if it becomes offline for an extended time. Moving the cursor over any portion of the viewer window causes the viewer program to display the viewer control bar, which then permits the user to modify the ad window viewing experience.

Figure 7:
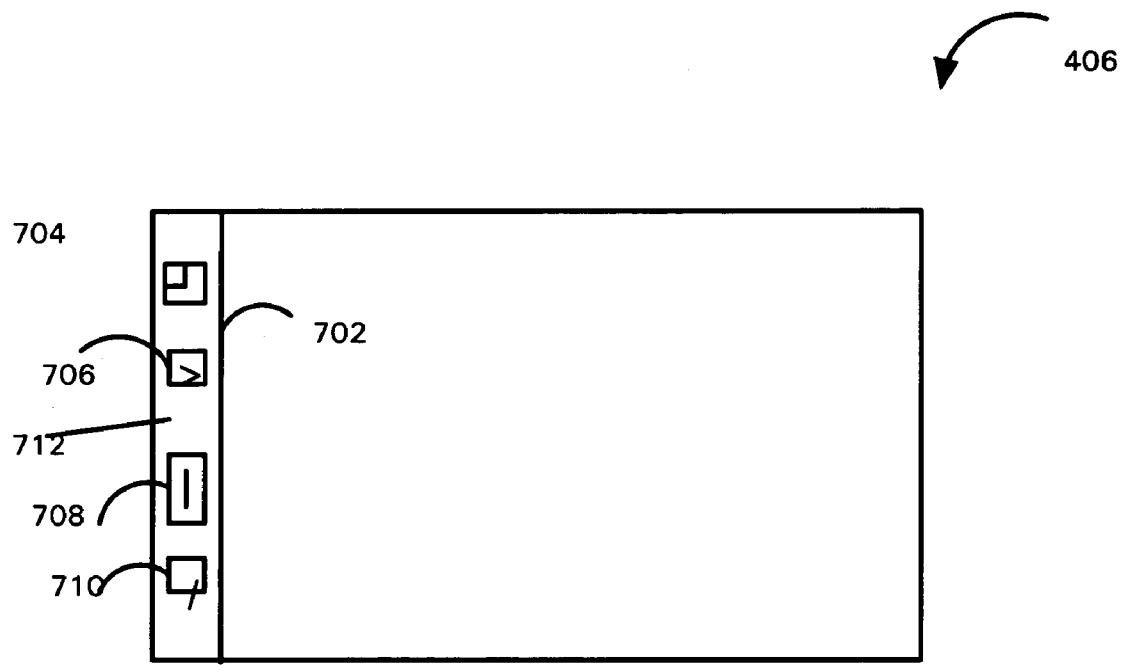
FIG. 7 is a representation of the viewer window display that is shown during ad playback.

FIG. 7 illustrates details of the viewer window 406 (FIG. 4) and control bar. The window control bar 702 is a vertical bar that includes a sizing icon 704 that permits a user to modify, within predetermined limits, the size of the window 406. The viewer program does not permit moving the viewer window completely off the user's desktop display area, and does not permit reducing the size of the window display beyond a minimum size. This ensures advertising sponsors of a minimum display area for their ads. The control bar 702 also includes a "Recent Ads" button 706 that opens a pop-up menu that lists the ten most recent ad sponsor names, as described further below, for accessing ad web sites. The viewer window of FIG. 7 also includes a volume control 708 that adjusts playback sound level. Finally, the viewer window has a mute button 710, for viewing ads without sound. A blank area 712 of the control bar provides a Move Bar that permits the user to move the viewer window 406 within the desktop area in usual windowing fashion by clicking and dragging.

Figure 8:
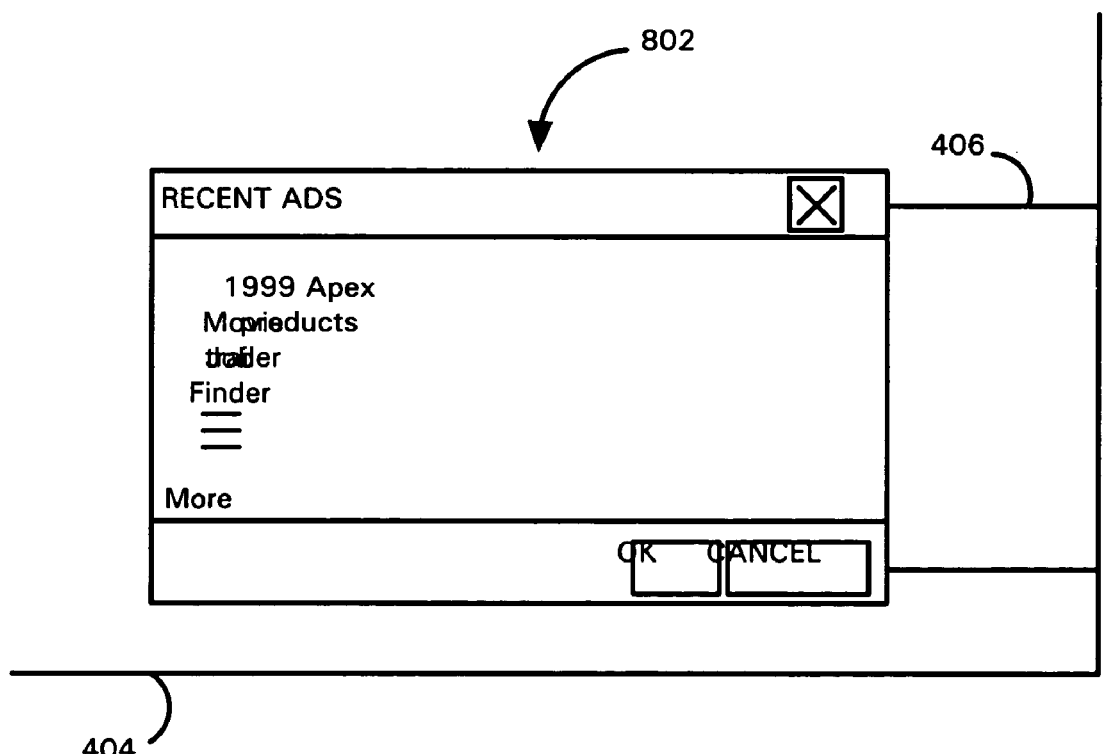
FIG. 8 is a representation of the Recent Ads pop-up menu selected from the viewer window of FIG. 7.

FIG. 8 shows an exemplary Recent Ads pop-up menu 802 that results from user selection of the Recent Ads button 706 (FIG. 7) and contains information about recently viewed ads from the ad pool stored on the computer. Preferably, the menu 802 shows the title or description of the ten most recently viewed ads of ad sponsors. Each entry in the pop-up menu corresponds to an ad in the ad pool. If the user clicks on any of the listed web sites, then the viewer program directs the user's browser to the corresponding web site. Other suitable formats of the "Recent Ads" menu will occur to those skilled in the art.

Figure 9:
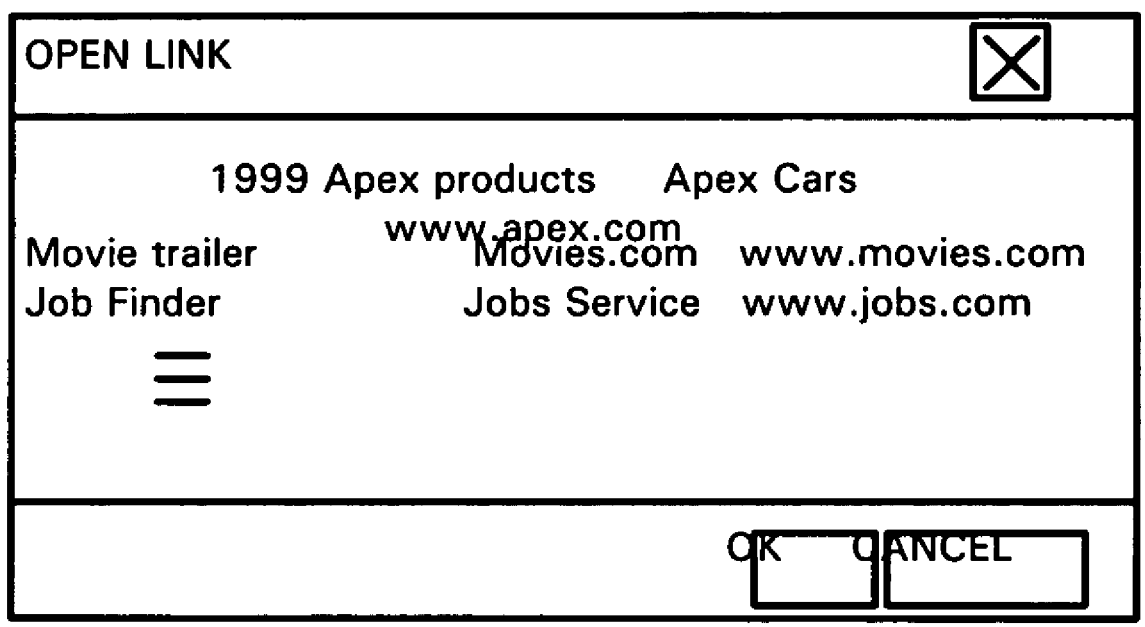
FIG. 9 is a representation of the Open Link dialogue box display that is shown during ad playback, selected from the Recent Ads display of FIG. 8.

The "Recent Ads" pop-up menu of FIG. 8 includes a "More" entry that when selected, causes an "Open Link" dialogue box to be opened. This dialogue box is shown in FIG. 9. The dialogue box lists the ad names, ad sponsor, and ad sponsor web site link. The link comprises a Universal Resource Locator (URL) address that directs the user browser to the corresponding web site. If an advertiser does not have a URL for a web site, then the FIG. 9 dialogue box inserts the web site of the ISP or some other designated web site. Thus, with the control bar and Open Link dialogue box, the user has management control of the Internet viewer window.

Figure 10:
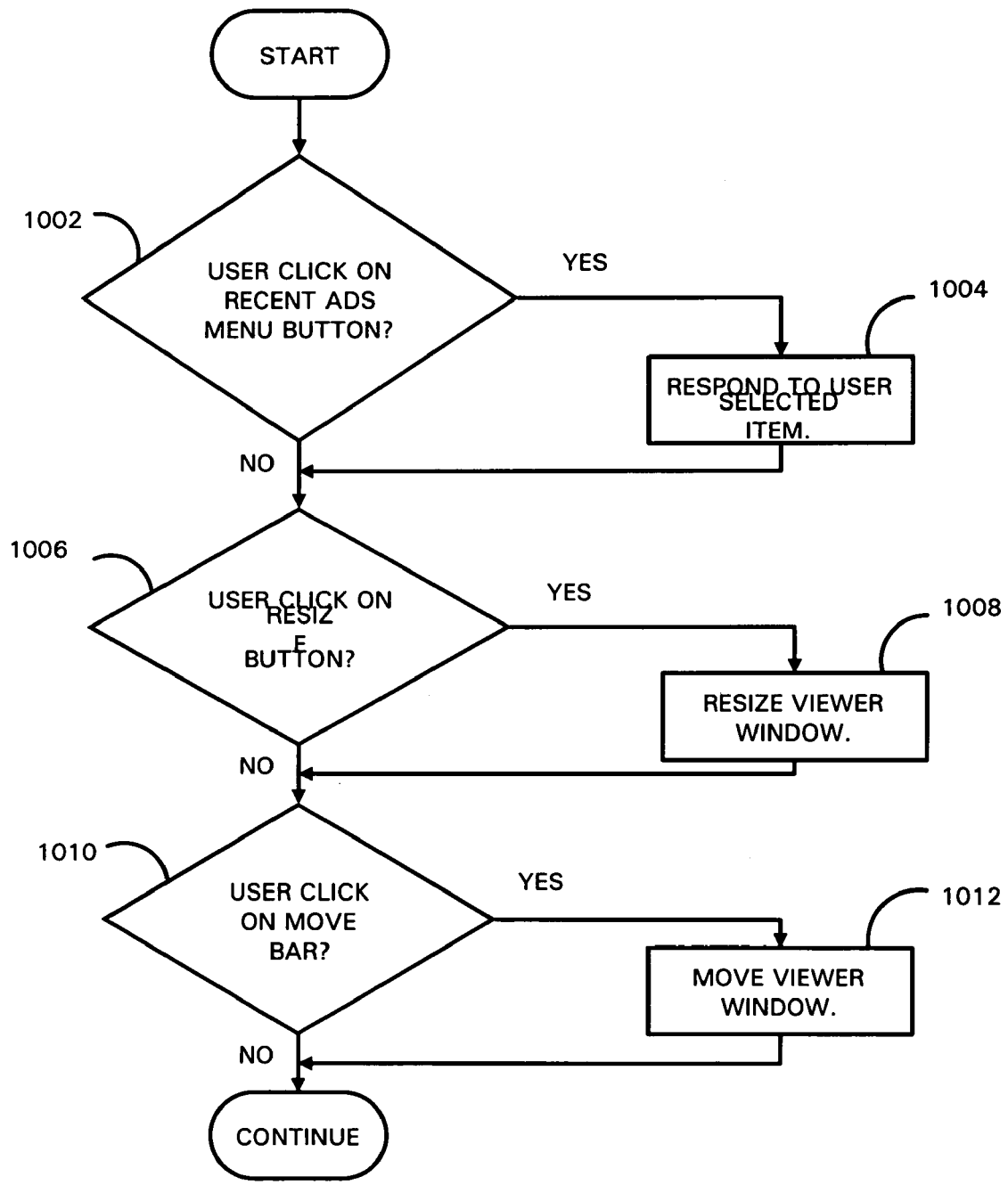
FIG. 10 is a flow diagram that illustrates the processing steps performed by the system to implement playback management control bar functions.

FIG. 10 is a flow diagram that illustrates the processing steps performed to permit the playback management control bar functions available to the user during ad showing. In the first processing step, represented by the FIG. 10 decision box numbered 1002, the viewer program detects when the user clicks on the Recent Ads control bar button 706 (see FIG. 7). If a button click is detected, an affirmative outcome at box 1002, then the viewer program responds appropriately by showing the Recent Ads menu described above. This processing is represented by the flow diagram box numbered 1004. In accordance with the invention, the user does not lose control of the browser when an ad is being shown. Therefore, if the user clicks on the Recent Ads button and the browser is directed to a sponsor's web site, the viewer window continues to show ads and continues to be active. Therefore, after the user clicks on the Recent Ads button and the viewer program performs its response at box 1004, or if there was no user click (a negative outcome at the decision box 1002), the viewer program operation continues.

Next, as indicated by the decision box numbered 1006, the viewer program determines if the user clicks on the resize button 704 (FIG. 7). If the user does, an affirmative outcome at the decision box 1006, then the viewer program permits resizing, within predetermined limits. The resizing operation is indicated by the flow diagram box numbered 1008. After window resizing, or in the event of no user display click (a negative outcome at the decision box 1006), the viewer program operation continues.

Finally, the viewer program determines if the user clicks on the control bar "Move" area 712 (FIG. 7). If yes, an affirmative outcome at the decision box 1010, then the viewer program permits the user to move the viewer window within the desktop display area, but will not permit the viewer to hide the viewer window. This operation is represented by the flow diagram box numbered 1012. After moving is complete at box 1012, or if there was no click (a negative outcome at the decision box 1010), the viewer program continues normal operation, including the display and download of ads.

Figure 11:
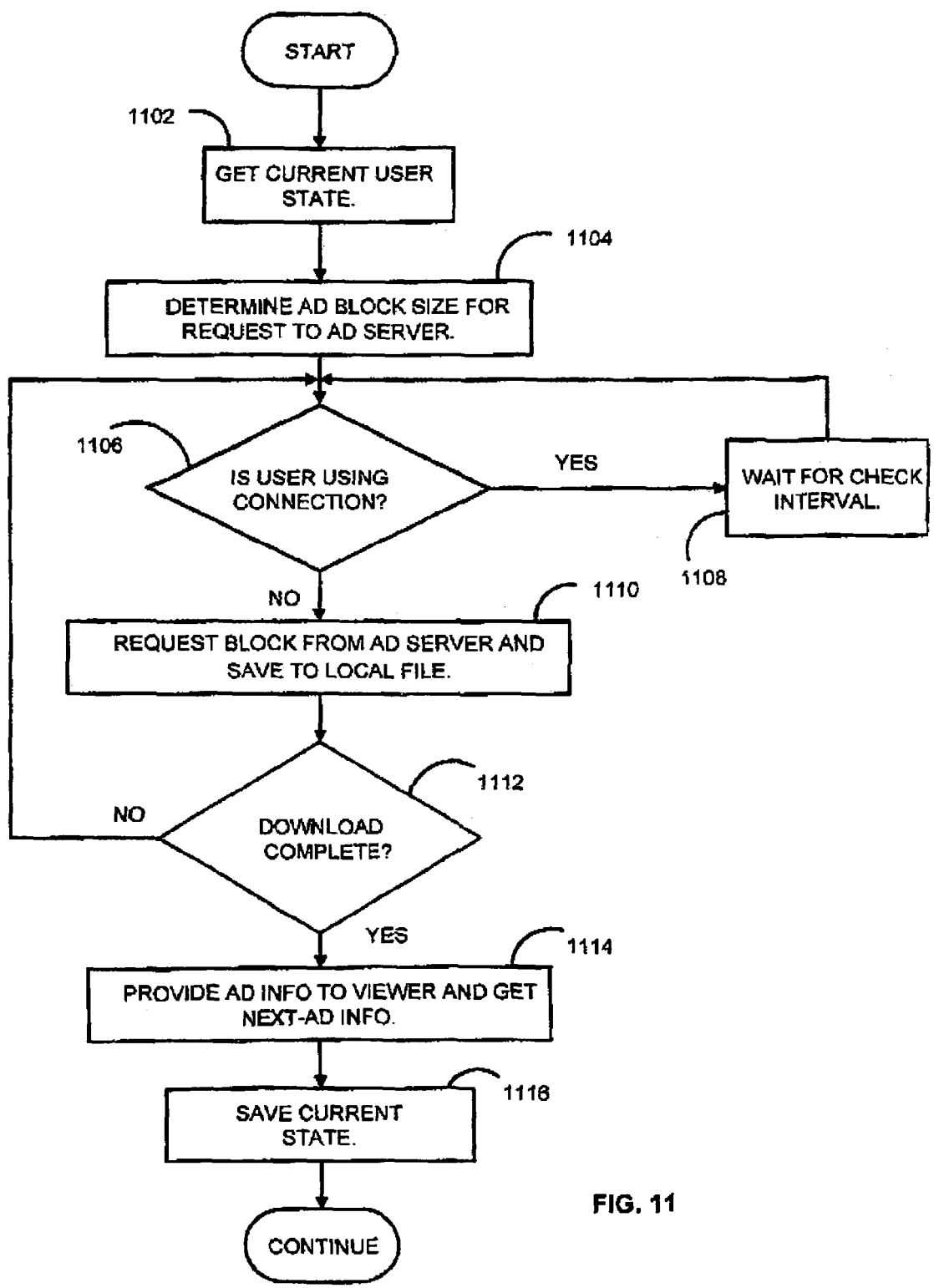
FIG. 11 is a flow diagram that illustrates the processing steps performed by the system in managing the ad download function.

As noted above in conjunction with the description of FIG. 3, the system performs ad file download tasks (box 306). FIG. 11 is a flow diagram that illustrates the processing steps performed by the system in managing the ad download function.

In the first download processing step, represented by the FIG. 11 flow diagram box numbered 1102, the current user state is stored in the local database. This information comprises status information, including the current ad file that is downloading in a background operation, where ad playback is on the play list, and the current ad file block that is being received. The state information is maintained by the viewer program so it can continue a download operation in progress even after the program has been shut down and restarted. The initial information is received from the Ad server when a new ad is requested. The viewer program then keeps track of where the download operation is, using the database to store the information. Thus, the Ad server need not store information relating to, or otherwise control operations for, the download process.

Next, the viewer program determines the ad block size to request from the Ad server, as indicated by the flow diagram box numbered 1104. The viewer program makes this determination based on the data rate available from the dial-up connection and, optionally, system resources such as processor speed, available memory, download latency, and modem speed. At the decision box numbered 1106, the viewer program next determines if the user is actively using the Internet connection (modem line) for external communication. The connection will only be indicated as currently in-use if, for example, the user is in the middle of downloading a web page or receiving a file from the Internet, or sending or receiving electronic mail. If the connection is being used, an affirmative outcome at the decision box numbered 1106, then the viewer program waits for a predetermined check interval (box 1108) and then checks again (box 1106).

When the Internet connection is not being used by the user, a negative outcome at the decision box numbered 1106, the viewer program sends a request to the Ad server for the file name from which download will commence (or continue), the offset from the file start where the block should be downloaded, and the determined ad block size. The user's viewer program then receives the requested data and stores the block to a local file. These file request and saving steps will be familiar to those skilled in the art, without further explanation.

After each ad block has been downloaded, the viewer program checks to determine if the entire ad has been received. This step is indicated by the FIG. 11 decision box numbered 1112. If the download is not complete, a negative outcome at the box 1112, then processing goes back to the flow diagram box numbered 1106, where availability of the connection is determined. If all blocks in the next ad have been received, an affirmative outcome at the decision box 1112, then the viewer program updates the secure local database, provides the completed ad information to the Ad server, and obtains information for download of the next ad, as indicated by the flow diagram box numbered 1114. The viewer program next updates the current state information in the secure local database, as indicated by the flow diagram box numbered 1116. The viewer program continues with other normal processing.

The viewer program preferably includes an Application Program Interface (API) that permits its functionality to be available to other programs, as known to those skilled in the art. In addition, means other than the viewer program may be used in download control.

As described above, the client viewer program of the preferred embodiment manages an ad pool stored in the user computer so that the ads are discarded in accordance with an expiration date of the ad. In another embodiment, the oldest ad is discarded when a new ad is received. A targeted client of the preferred embodiment provides greater flexibility in managing the ad pool and targeting ad files to individual users. The targeted client permits selection of ad files to be provided to individual subscribers of the access service by collecting demographic information upon initiation of the access service to a subscriber. That is, both the viewer client and the targeted client receive ad files from specific users, and an ad server that works with the targeted client will send ad files to specific users based on demographic information received from each particular user.

In the preferred embodiment, a single targeted client installed at a user computer is associated with a single user who subscribes to the Internet access service, although the user of an installed targeted client can also be associated with multiple member accounts. For example, the initial user who establishes a subscriber account at a computer or machine becomes the "master" account, and additional member accounts may be associated with that master user account. After the user account is established and user demographic information is collected for the master account, the additional member accounts may be established from the same computer, and corresponding demographic information will be collected from each new member. It should be understood that references to "user" in this discussion will mean either a master user account or an associated member account, unless otherwise specified. Ad files will be targeted to each different user. Moreover, the preferred embodiment permits multiple users to share ad files on the same computer, to conserve network bandwidth and avoid waste of resources that would be associated with downloading the same ad file multiple times.

Figure 12:
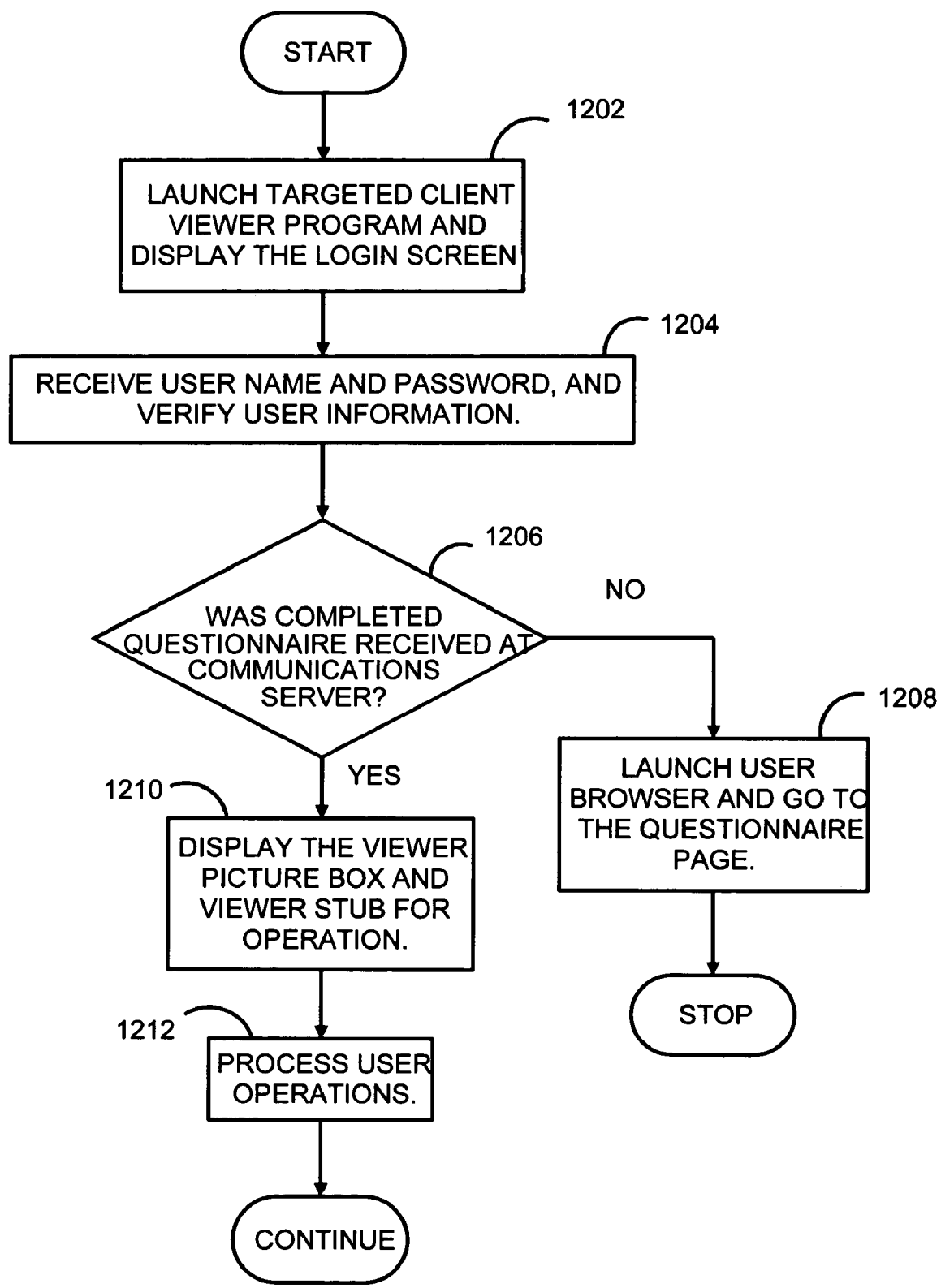
FIG. 12 is a flow diagram that illustrates the login sequence of the targeted client of the system illustrated in FIG. 1.

The targeted client of the preferred embodiment ensures collection of demographic information from users by operating such that it must have confirmation of such information before permitting user access. The operation of the targeted client when installed in the user computer 102 is illustrated in FIG. 12.

Figure 13:
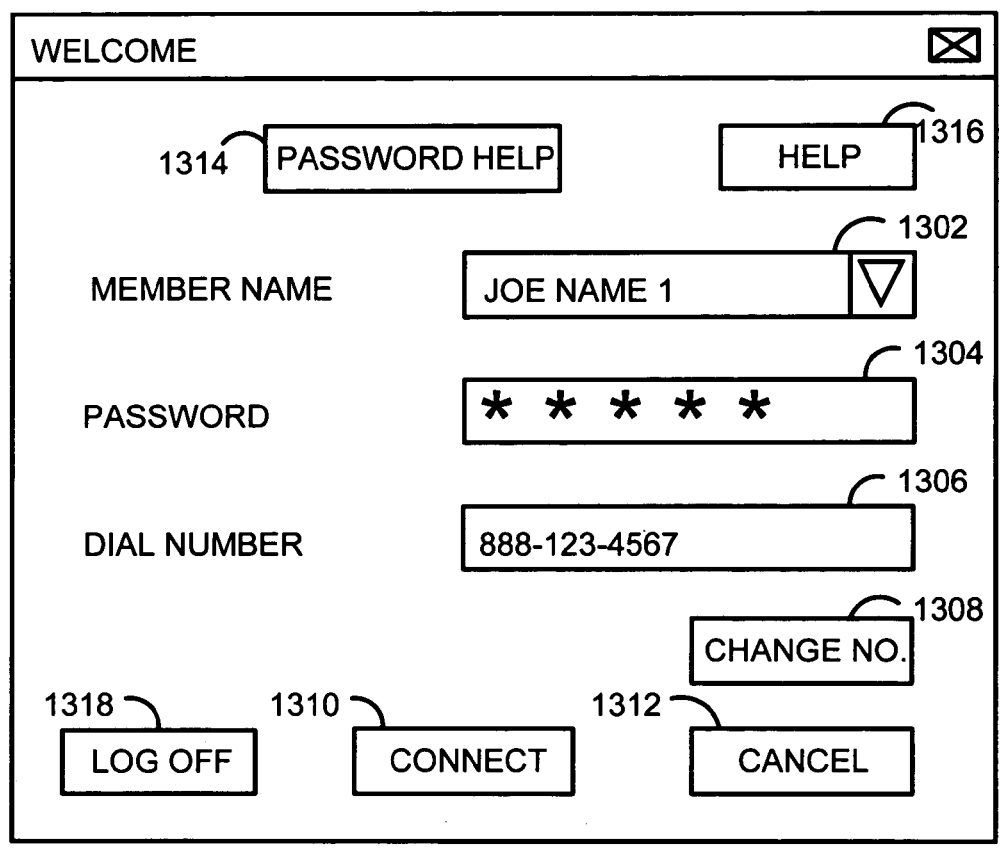
FIG. 13 is a login screen of the targeted client that appears during the computer operation illustrated in FIG. 12.

In the first program step, represented by the flow diagram box numbered 1202, the user launches the targeted client viewer program to establish a communications session, which causes display of the targeted client login screen. An example of the log in screen display 1300 that the user will see is illustrated in FIG. 13. The log in screen will be shown on the user's computer display, on top of any other active window. The user must enter appropriate member name 1302 and password information 1304 to establish a log in session with the communications server. In the case of a dial-up connection, a text box for a dial-up telephone number 1306 must be filled in to select a network connection. For a broadband interface, the telephone number may also be entered to indicate the geographic location of the user. In the preferred embodiment, the last number used will be maintained in the text box 1306 for the next session. If the user wishes to change the telephone number, a "change number" display button 1308 is provided for that purpose. When the user is satisfied with the information entered, the user selects the "Connect" display button 1310 to initiate the communications session. A "Cancel" display button 1312 is provided to terminate the log in process. The log in screen 1300 also provides password help 1314 and general help 1316 display buttons.

Figure 14:
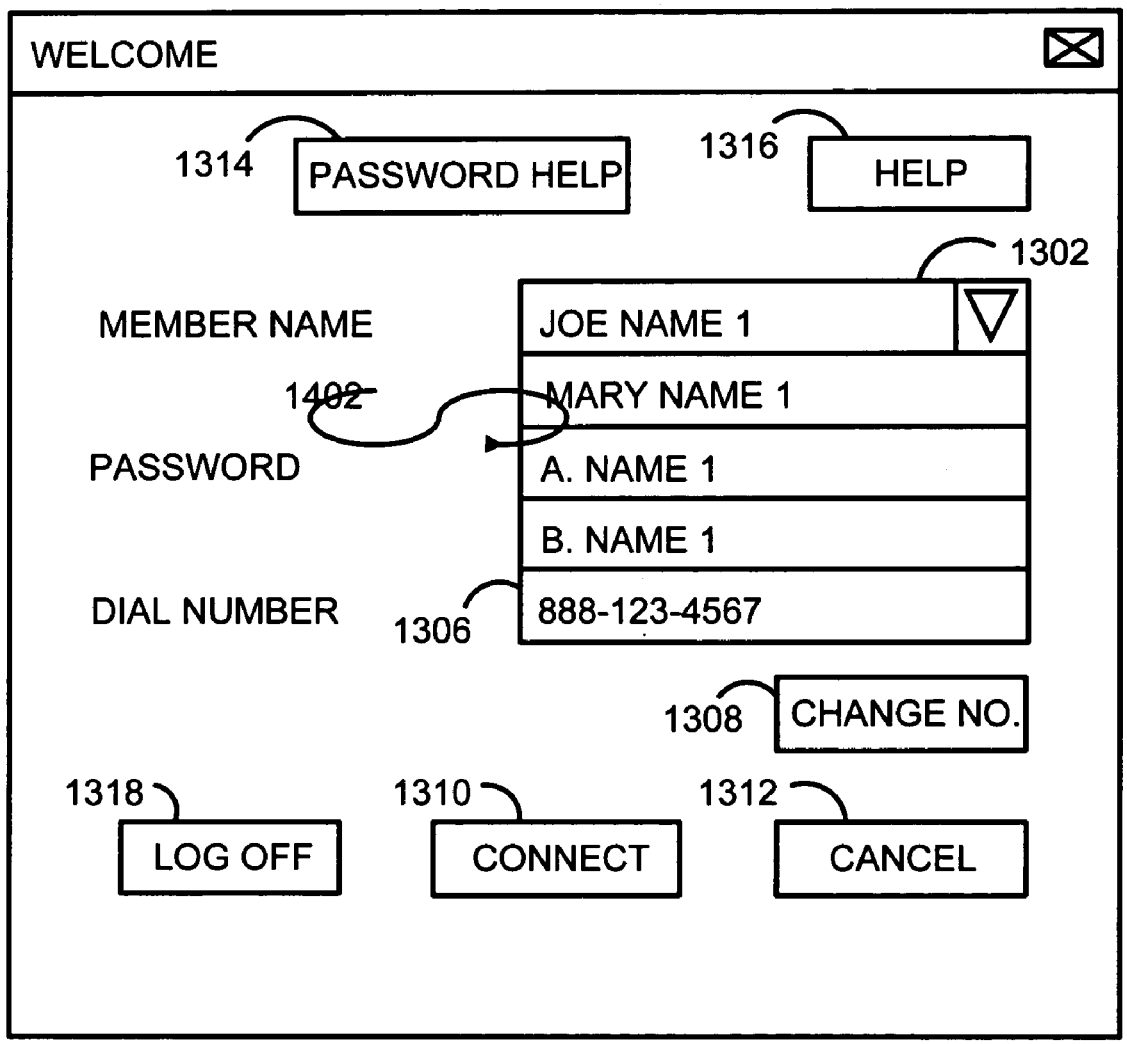
FIG. 14 is the login screen of FIG. 13 showing the ability to associate additional subscribers at a user computer.

As noted above, multiple users can be accommodated with the targeted client viewer program. FIG. 14 shows a log in display screen 1400 similar to that of FIG. 13, except that the drop-down menu has been selected for user name 1302 to show additional names 1402 that have previously been registered with the access ISP. Thus, additional family members may have their own accounts, so long as they are associated with a "master" account and have filled in separate access questionnaires. In this way, the ISP is ensured of capturing the most accurate data for the particular users who may be on-line at any moment.

After the user enters the log in information in the window 1300 and selects the "Connect" 1310 button, the log in information is sent from the user computer to the communications server 106 (FIG. 1), (after a connection has been made to the server via Dialup or network connection, e.g. PPPOE—Point to Point Protocol over Ethernet) which validates the information from a server database. This processing is illustrated in the FIG. 12 flow diagram box numbered 1204. Upon validation of the user information, performed using known techniques or customized authentication protocols, the communications server determines if a completed questionnaire was received from the user, for registration purposes. This is represented by the decision box numbered 1206. If no questionnaire was received, a negative outcome at the decision box, then the server causes a Questionnaire page to be displayed in a browser at the user computer, as indicated at the flow diagram box numbered 1208. If the user browser is not running, the browser is launched. The browser program may comprise, for example, "Navigator" by Netscape Communications Corporation or "Internet Explorer" by Microsoft Corporation. If the server determines that a Questionnaire was previously received from the user, an affirmative outcome at the decision box 1206, then the server will initiate display of the viewer box for normal operation. This process is represented by the flow diagram box numbered 1210. The system then processes user operations, including viewing Internet content and accessing various application programs, as indicated by the flow diagram box numbered 1212.

Figures 15, 16:
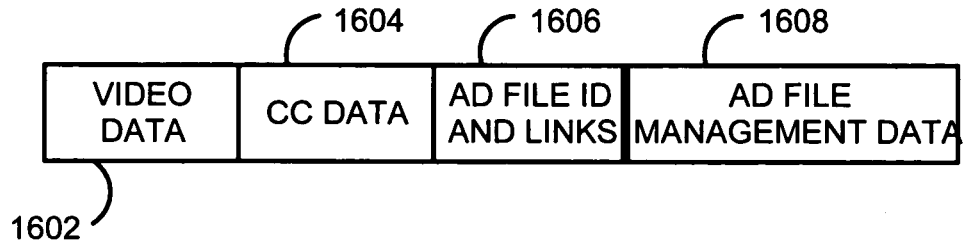
FIG. 15 is a browser questionnaire page that appears during the computer operation illustrated in FIG. 12.
FIG. 16 is a representation of header information in an ad file that is received by the targeted client illustrated in FIG. 1.

FIG. 15 shows an example of the Questionnaire page 1500 that will be shown in the user browser as a result of being sent from the communications server. The questionnaire page assists the access ISP in collecting the demographic information that will be used in targeting specific ad files to the particular user. That is, each user name that is entered into the communications server database from a log in screen will be required to fill out and submit the questionnaire page 1500 before a log in session can proceed with general network access through the user browser, e-mail program, or the like. FIG. 15 shows that the demographic information categories that will be collected include personal identification (name and address), geographic location, age group, gender, marital status, occupation, income group, and a variety of personal interests such as hobbies, automobile owned, participation sports, and the like.

After the user demographic data is received at the communications server 106 (FIG. 1), the server will send video ad files to the client. Ads are downloaded (and displayed) on a "per online session" basis, or based on the amount of time a user is online, regardless of the number of online sessions involved. The ads to be downloaded comprise a playlist that specify the ad files to be kept in the ad pool stored at the user computer. As described further below, the download operation may be modified, depending on a "download list" system file. Each different user must establish a different log in session when accessing the network.

If ads will be downloaded on a per-online-session basis, then the number of ads that will be displayed per online session should be equal to the number of ads that must be downloaded during that session. Therefore, if the client cannot download a sufficient number of ads during the corresponding session, the client must "catch up" by downloading more ads in future online sessions than are to be played during those respective sessions. To provide for the "catch up" operation, the client will create an ad pool and will cycle through ads in the ad pool, repeating ads where necessary, to compensate for short sessions where a complete ad cannot be downloaded. The number of ads that must be downloaded can be reduced below the number of ads that play during the session by setting the minimum play setting on the ads in the pool to a number greater than one. Such ad play settings can be set in the ad file management data 1608 (FIG. 16).

In an alternative preferred embodiment, where ads are downloaded according to user online time, the number of ads displayed per predetermined time period is equal to the number of ads that will be downloaded during that time period. For example, the number of ads downloaded during a one-hour online session will be equal to the number of ads to be displayed during a one-hour period. Alternately, the number of times a specific ad is displayed is dependant on how many ads are downloaded in a specific time or session.

For example, in one embodiment of a per-session mode of operation, the server will send, and the client will accept, at least one video ad file per log in session, if required by the user. That is, if a first user completes the log in process, the communications server will begin sending the first user a video ad file. If the first user terminates the log in session for any reason, including loss of communications connection or log off, then the state of the ad download will be maintained so that download can continue where it was terminated at the initiation of the next log in session. The first user can log off from the communications session, such as by selecting the access service icon from the user program tray to be taken to the "Welcome" screen 1300 to select log off. Alternately, a separate logoff screen could also be used. Upon selecting log off, the first user session will be terminated and a second user can complete the log in information (FIG. 13), select "Connect", and establish a new log in session. During the second user log in session, the server will send, and the client will accept, at least one video ad file. As for the first user, the download operation may be modified by the download list.

After the user demographic data is received at the communications server, video ad files will be sent to the client from the communications server 106. Additional files will be sent periodically during user access as described above. The data format of the video ad files received by the targeted client permits flexibility in ad pool management, targeting, and display. The data file format comprises multiple data records that, when processed by the viewer program, result in display of a video presentation in the picture box window as described above.

FIG. 16 is a representation of the data format in a data record of a video ad file for the targeted client. In the preferred embodiment, video data 1602 occupies most of a data record. A closed captioning field 1604 occupies another field, consisting of text data that is displayed along one edge of the viewing window and that corresponds to the audio information being provided through the computer speaker. Alternatively, the closed captioning field can display text comprising information independent from the audio track, such as promotional information and the like. The next data field contains ad file identification and link data 1606. Such information comprises fixed-length data variables that identify the ad file to which the data record belongs and also includes byte offsets from the end of the data record 1600 to specify the location of variable-length data fields.

The last type of data field contains the variable-length data fields, comprising ad file management data 1608. The ad file management data includes information such as ad file title, ad sponsor name, URL of linked sponsor web site, and the like. Additional ad file management data may include the number of times the ad should be played before deletion, or specific calendar days beyond which the ad will expire and should not be played. The targeted client 102 of the preferred embodiment will download ad files as described above, such that the download occurs in the background of a user's Internet access and is transparent to the user during operation of the targeted client.

Figure 17:
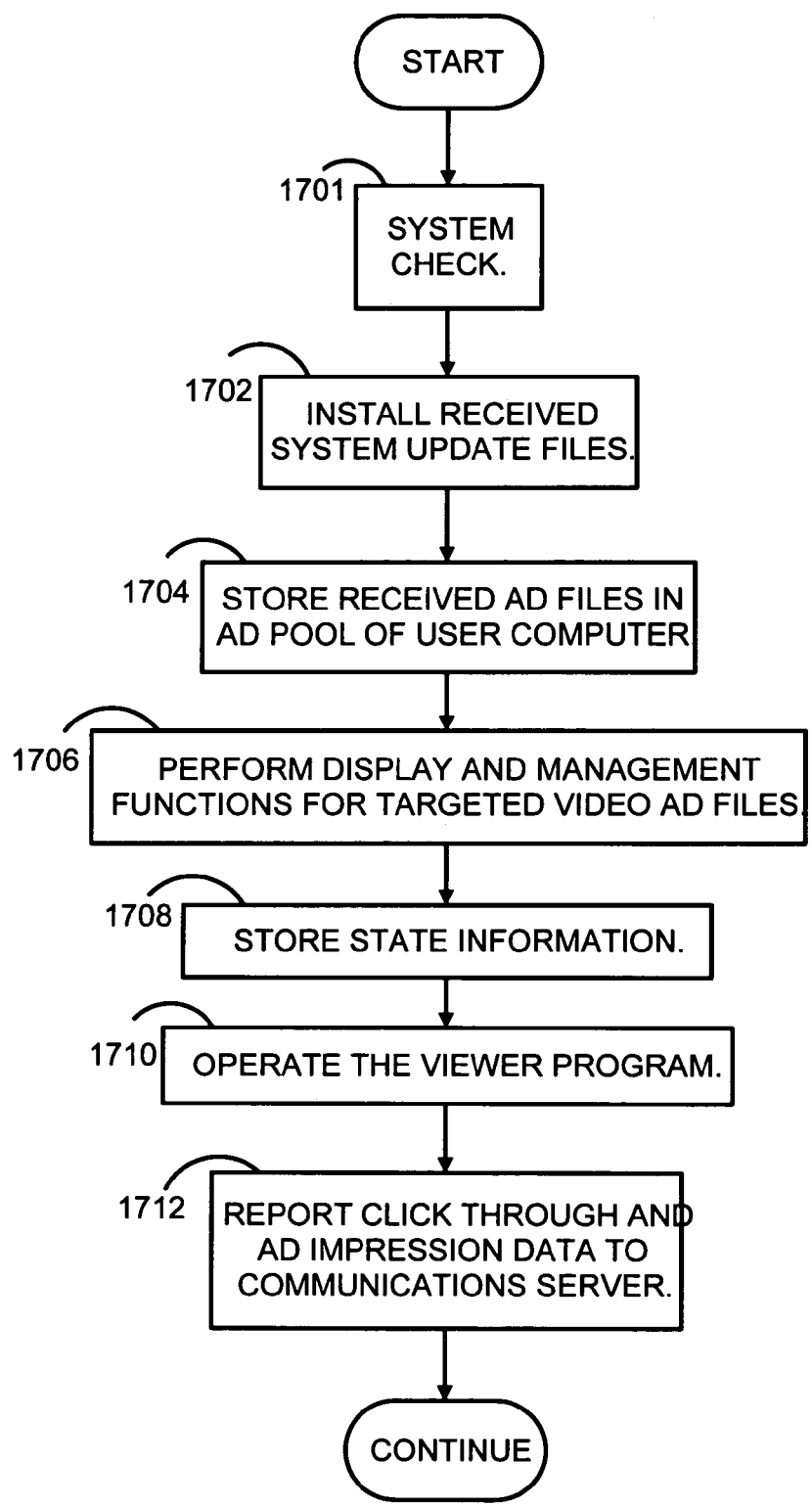
FIG. 17 is a flow diagram that illustrates the normal operation of the targeted client of the system illustrated in FIG. 1.

FIG. 17 is a flow diagram that illustrates the normal operation of the targeted client of the system illustrated in FIG. 1. In a first step of normal operation, represented by the flow diagram box numbered 1701, the client performs a system check to ensure that all necessary files are available on the user computer. Next, the client installs system update files that are received from the communications server (box 1702). Such files are recognized by the targeted client, such as by having special file name extensions, and are stored into predetermined directories of the user computer. Such system files are blocked from user access, in that the user is not permitted to edit or view such files, and may comprise hidden files of the user computer. As noted for the first step 1701 of client execution, the client will not permit execution without the system files. The system files include a download list, which instructs the client as to the number of ad files it should have, and which particular ad files it should receive from the communications server. In addition to storing system files, the client stores received ad files. This step is represented by the flow diagram box numbered 1704. Unlike the system files, the ad files are not hidden or inaccessible to the user, although as explained further below, they cannot be viewed without the viewer program. It will be appreciated that the ads may be viewed by someone skilled in art using existing player technologies. For example, video data could be extracted from the file for use with another viewer.

In the next client processing step, represented by the flow diagram box numbered 1706, the targeted client performs ad file display scheduling and management tasks. Ad files are typically shown in a playlist group or "pod" of five ad files. Thus, the targeted client will schedule the display of five ad files at a time. For the targeted client, ads may be programmed by the communications server to play any specified number of times, and the client will keep track of the number of ad plays actually achieved. This information may be stored by the client in a data file of the user computer. When an ad has achieved the required number of plays, it is discarded from the ad pool. In this way, the viewer program maintains an ad pool that provides a desired number of ad impressions, or viewings, that may be measured in seconds of viewing time per hour of online time.

In particular, the available viewing inventory for a typical user may be said to comprise the number of ads to be viewed per hour multiplied by the number of impressions per ad, multiplied by the number of viewing seconds per ad. In one scenario, four ads may be viewed per hour of online time, and each ad may be set for five impressions (viewings), with each ad having a running time of thirty seconds. In another scenario, up to twenty ads may be viewed in an hour of time. Therefore, for each hour of online time, that user would have 600 impression seconds (imps) to be scheduled. Thus, the ad pool of the user may be scheduled for up to 600 impression seconds of ad files for each hour spent online. The client program may schedule ads, preferably such that ads are viewed for a minimum of thirty seconds for every fifteen minutes of online time and a maximum of 2.5 minutes for every fifteen minutes of online time.

The targeted client maintains a predetermined size for the ad pool, but allows the pool size to become larger when instructed by the communications server. In this way, the ad pool assumes a "flex pool" operational configuration that minimizes the chance of an ad playing beyond the set maximum number of times for the ad, which is especially important when the download time for ads is exceeding the allotted average download time. That is, the maximum number of plays on an ad can be automatically increased by the client to compensate for longer than expected average download times. The minimum and maximum ad play settings help to guarantee distribution and exposure frequency to advertisers.

For example, seasonal ads may be downloaded and may temporarily occupy space in the ad pool. With each ad play, the processing of box 1706 updates the ad play information for the ad. A complete ad play comprises an "impression" unit. A partial play, such as where an ad file is prematurely halted before normal viewing completion because communication is terminated, will not result in a tally of a viewing impression for that ad file. In this way, sponsors can be guaranteed a particular number of impressions (complete viewings) by targeted users.

The targeted client may implement other flexible scheduling assignments. As noted above in conjunction with the description of FIG. 15, ads may be displayed and downloaded on a per-session basis or on a cumulative online-time basis. For example, the download list obtained in step 1702 may specify a particular day and time period during which an ad should be displayed. In the processing for step 1706, the client may cause the ad to be displayed at the appropriate time of day, if the user is accessing the Internet with the client at the appropriate time. The client may delete an ad file from the ad pool if the ad pool exceeds a maximum size allotment. Preferably, the client deletes the ad with the closest expiration date or any ad that has exceeded its maximum impression count from the ad pool. In another embodiment, the client deletes the oldest ad file from the ad pool. In addition, as noted above, the header information (FIG. 16) of each ad file specifies an industry code. The targeted client checks industry codes as it schedules ad files for viewing to ensure that ad files having the same industry codes are not shown in the same ad pod. This provides a desired measure of exclusivity for a sponsor.

The targeted client processing represented by the flow diagram box numbered 1708 indicates that the client stores state information during normal operation. The state information includes data such as viewer settings for each user, currently displaying (or last displayed) ad file, and picture box display location. The targeted client processing represented by the flow diagram box numbered 1710 represents operation of the viewer program to show a video ad file in the picture box, in the location set by the user. User actions also are tracked, such as launch of e-mail programs, web sites visited during ad play (click through information, described further below), and the like. The processing of box 1710 also includes, if selected, the processing of closed captioning information.

In the processing of the flow diagram box numbered 1712, the client reports click through data and ad impression data to the communications server. The click through data comprises the URL addresses of web sites to which the user's browser was directed during the display of an ad file. A typical ad file will take the user browser to the ad sponsor's web site if the user clicks on the viewing window during ad play. Thus, the viewing window is linked to the sponsor site. The processing of box 1710 above tracks such data during ad file play and stores it in a user system file, and the processing of box 1712 periodically sends such data to the communications server. For example, the client program may send the data after every tenth user action, or downloaded site. Other processing of the user computer then continues.

Figure 18:
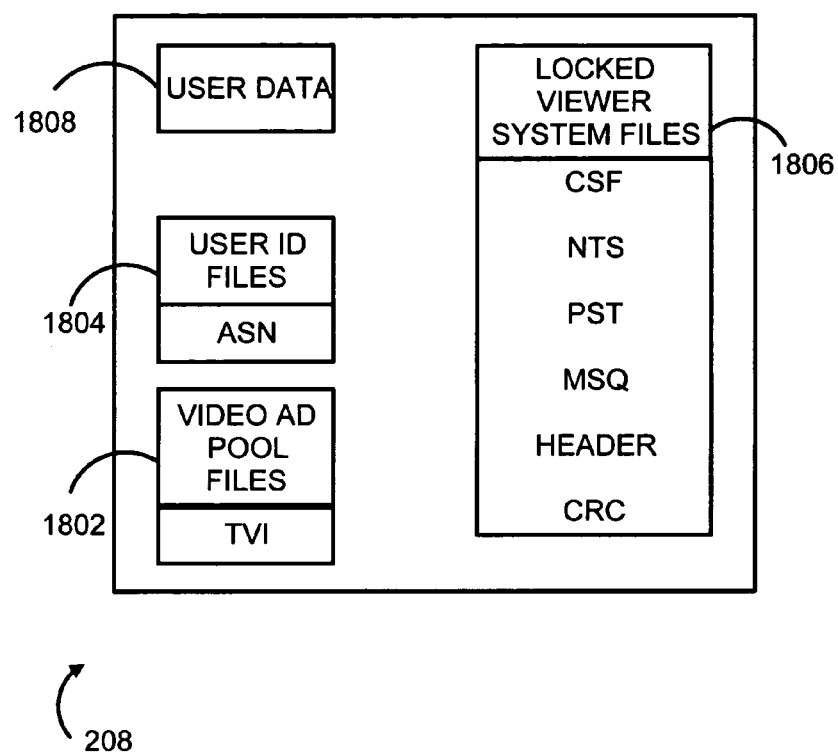
FIG. 18 is a representation of the system files for the targeted client that are stored at the user computer.

FIG. 18 is a representation of the user computer data storage 208, showing the system files for the targeted client that are stored at the user computer. Thus, with the targeted client installed, the user computer data storage will include ad files in a video ad pool 1802, user identification files 1804, and the locked viewer system files 1806. Other user data 1808 will occupy the remainder of the user data storage. As noted above, the various files stored by the targeted client may be identified by their file name extension. The targeted video ad files, for example, will have a "tvi" extension (file name of *.tvi). The system files 1806 include files for client settings (*.csf), network settings (*.nts), ad pool state (*.pst), a message queue (*.msq), and header files. In addition, error checking and cyclic redundancy check (CRC) information will be embedded in the files. The user ID files 1804 specify the access numbers for the user.

Figure 19:
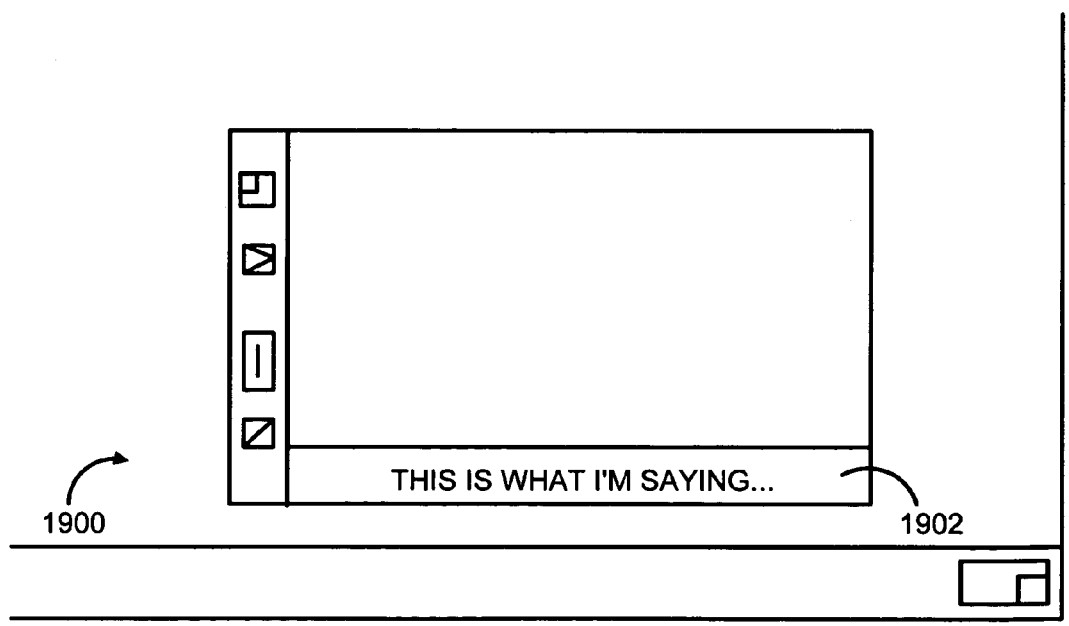
FIG. 19 is a picture box window of the targeted client illustrating the closed captioning feature.

FIG. 19 shows the picture box program viewer display 1900 as positioned over the user browser, such as illustrated in FIG. 4. In the FIG. 19 embodiment of the targeted client, however, a "closed caption" display feature is invoked. The closed caption information comprises text that corresponds to the audio program material that is in the ad file, placed in a display area 1902 at the bottom of the video screen display of the viewer. Other text may also be used in any of a wide variety of manners.

Figure 20:
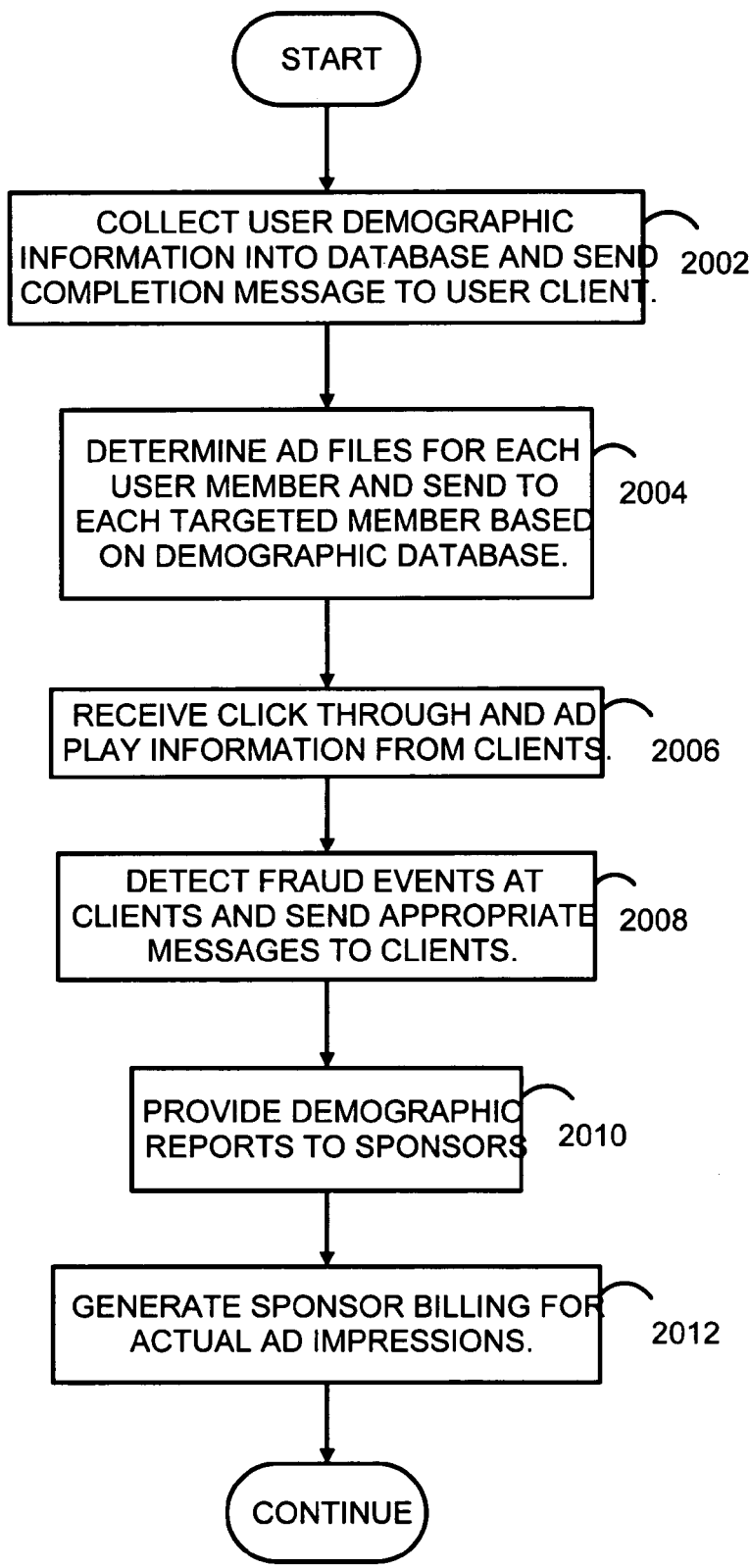
FIG. 20 is a flow diagram that illustrates the normal operation of the communications server that operates with the targeted client of the system illustrated in FIG. 1.

FIG. 20 is a flow diagram that illustrates the operation of the communications server for operation with the targeted client. In the first operating step, represented by the flow diagram box numbered 2002, the communications server collects user demographic information and stores it into a server database. It then sends a completion message to the client, which stores the completion message among the system files described above. Thus, both the client side and server side will have questionnaire completion information, such that the log in process can be terminated by either processor if no demographic questionnaire has been received by the communications server for the user who is attempting log in.

In the next server processing step, the server determines which ad files should be provided to the user who has completed the log in process. The server makes this determination based on the demographic data in the database for the logged-in user. The database for each user includes a stored list of the video ad files that have been downloaded to the user. The server processing determines the video ad files that should be stored at the user according to available inventory and user demographics. If the user already has all appropriate ad files, then no further download is needed and no files are sent. If the user requires additional ad files for proper rotation and viewing, then the client program will communicate the need for additional files to the server, which will begin sending them to the client via a background download process, as described above for the viewer client. This processing is represented by the flow diagram box numbered 2004.

The processing of the flow diagram box numbered 2004 also includes the ad inventory control mechanism described above, which controls the number of ads being downloaded and displayed. The processing 2004 permits the ad file inventory to be monitored either for a predetermined time period of online usage for each user or by the number of online sessions for each user. This ensures accurate tracking of the available ad impressions. The available impression inventory is measured in an exposure metric such as "impression seconds" to allow for different length ads (commercials). Total impression seconds available will be calculated through a function of online time, for example, time spent online over a fixed period of time (such as eight weeks or thirty days) by a user or the number of online sessions over a fixed period of time for a user. As used herein, the term "impression second" means one second of an impression.

Next, as represented by the flow diagram box numbered 2006, the server receives click-through and ad play information from the client at least once per log in session. The click-through information preferably includes web site addresses for the linked sites to which the user was taken upon clicking on the viewer display during the play of a video ad file. An ad identification may also be sent. As noted above, clicking on an ad being shown will take the user to an appropriate web site, depending on agreements between sponsors and the access ISP. For example, a sponsor may have its ad file linked such that a user is taken to an e-commerce portal site for purchase of product. Alternatively, a sponsor may want a user to be taken directly to the sponsor web site. Still further, an ad file may comprise some other video information, such as a public service announcement, an educational clip, an entertainment piece, or other video short clip, and the link in response to user click-through may comprise some other action, as desired by the sponsor or provider of the video short clip.

As part of the server processing, the server also detects fraud events, such as attempted deletion of ad files, password abuse, and the like. Upon the detection of fraud events, the server will send a message to the user, directed to a user e-mail or postal address provided during the registration process. After a predetermined number of fraud events have occurred from the same user, the server may refuse access to that user upon any attempted subsequent log in process. This fraud checking operation is represented by the flow diagram box numbered 2008.

The communications server also provides the collected demographic information to sponsors in a variety of report formats. Preferably, such reports are delivered via network access, such as through Internet web sites. Thus, a sponsor may communicate with the communications server in a similar client-server arrangement as illustrated in FIG. 1.

Such communications between the sponsor and the communications server will involve appropriate sponsor identification and security authorizations, as will be known to those skilled in the art. This processing is represented by the flow diagram box numbered 2010.

Finally, in the processing represented by the flow diagram box numbered 2012, the communications server generates sponsor billing for the actual ad impressions recorded by the server. It should be noted that, because of the click-through and viewing information reported by the clients (step 2006), the communications server will have precise actual ad impressions, or viewing events, by the users who make use of the network access service in accordance with the invention. Therefore, precise, verifiable billing can be presented to sponsors. In this way, sponsors can be assured of accurate billing that reflects actual ad impressions from end users, not just aggregated hit data or other collected statistics that are typical with most other Internet ad tracking systems.

FIG. 21 shows a Demographic Report page that the communications server generates for display at a user computer for a user who is a sponsor of the access service. The server generates the data necessary for the display by extracting information from the database it maintains and sending the information to the sponsor user. In the preferred embodiment, the Demographic Report is displayed in a browser application. The report page is provided to a user only after the user has been identified as an authorized sponsor who is entitled to the information in the report. This is preferably implemented with a user name and password log in screen, similar to that illustrated above for access service users, so that the communications server will provide the information only to appropriately identified sponsor-users. In this way, the sponsors themselves may also be provided with free Internet access. Sponsors could also access the Internet using their own Internet provider.

The Demographic Report page of FIG. 21 identifies the recipient of the report and lists the ad files on which data has been collected. In FIG. 21, the first such ad file is identified as "AD1". The time period for the collected data is selectable through data entry, such as drop down lists. In the Report page, a summary of the collected data is provided to show the total number of ad impressions (viewings) and also to show the number of unique impressions (not counting any single user more than once). The number of click-through events also is listed, representing the number of click-through events out of the total number of ad impressions. The advertising rate charged per impression may be listed for certain privileged users, as is the cost to the sponsor for the number of ad impressions received by virtue of the access system of FIG. 1.

The Demographic Report page permits a sponsor to see a View Report page by selecting a "View Report" display button. The View Report page provides report options such as illustrated in FIG. 22.

FIG. 22 shows the selectable report fields that a sponsor may indicate with check boxes, such as age groups, gender, income, occupation, geographic location of users, and user interests. In this way, a sponsor may tailor the data being delivered according to those groups that are of the most interest, to determine the response a particular ad file is receiving from the target audience. The sponsor may use such information to further tailor the target audience to whom the ad files are sent, because the communications server has demographic information on all registered users and therefore can select individual users for receiving or not receiving ad files, in accordance with instruction from the sponsor.

If a sponsor desires, a more detailed view of the report data can be obtained. FIG. 23 is a Report Data Graph browser display page that is displayed at a user computer in the FIG. 1 system for a user who is a sponsor of the access service. FIG. 23 shows that a detail page of the communications server provides additional information on the report categories. For example, each of the age groups is broken down in the FIG. 23 display page and the raw data for each age group is listed, with impressions and click-throughs for each age group. The detail information for each group includes the impression-to-click-through data. Similarly, the detail information includes data for sub groups of gender, income, and so forth.

The Report page (FIG. 22) also permits a sponsor to view archive information, so a sponsor can examine historical data collected in advance of the most recent reporting period. An example of an Archive display page is shown in FIG. 24. As with the other reporting display pages, the Archive display is generated by the communications server and is sent to a properly authorized network user, based on the reporting data collected from users as they utilize the network after they have provided their demographic data.

Figure 25:
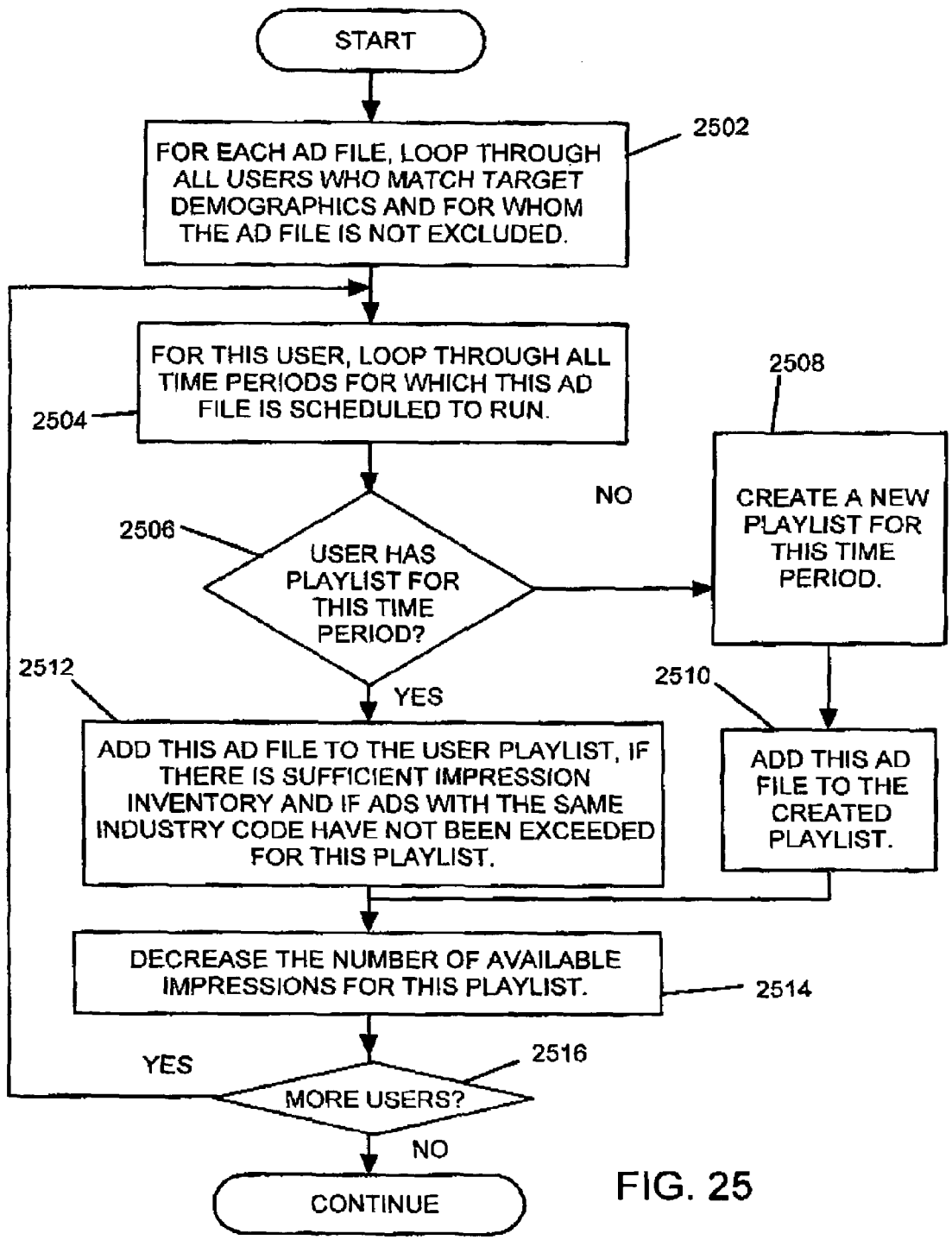
FIG. 25 is a flow diagram that illustrates the operation of the communications server in determining the ad files to be sent for each user with the targeted client of the system illustrated in FIG. 1.

FIG. 25 is a flow diagram that illustrates the operation of the communications server in determining the ad files to be sent for each user with the targeted client of the system illustrated in FIG. 1. In the first operating step, represented by the flow diagram box numbered 2502, the server processes each ad file to be distributed by examining the demographics data collected from the registered users and identifying those users whose demographic profile matches the profile corresponding to the ad file and for whom no exclusion is in place. In the preferred embodiment, an exclusion may be specified whereby certain ad files will be excluded from distribution to particular users. The excluded ad files may be identified by sponsor name, industry code, geographic location, content, or some other characteristic.

Next, at the FIG. 25 how diagram box numbered 2504, the server processes all time periods for which the ad is to be viewed. For example, ad files may be scheduled for downloads on a weekly basis, so that the time periods in question will comprise a predetermined number of weeks into the future. In this way, a sponsor can specify the times over which an ad will be viewed, perhaps coinciding with a special event or sales promotion. The time periods may be spaced apart, such as every other week for six weeks, or may be for a set period, such as the next two months. The processing of box 2504 ensures that the ad file is not distributed outside of the specified period of time.

If the ad file is appropriate for the user and is within the scheduled time period, then at the decision box numbered 2506 the server will determine if the user has a playlist for the time=period in question. If the user has no playlist, a negative outcome at the decision box 2506, then the server will create a new playlist for this user, for this time period, as indicated at the flow diagram box numbered 2508. The server will then add the ad file being processed to the playlist being created (box 2510). If the user has a playlist, an affirmative outcome at the decision box 2506, then at box 2512 the server will check the user's impression inventory, which is the number of ad file slots in the ad pool size set for this user. The server will also check to ensure that an industry code assigned to the ad file is not already present in the playlist above a threshold limit number. If there is sufficient impression inventory, and if the industry code parameter has not been exceeded, then the server will add the ad file being processed to the existing user playlist.

After the ad file has been added to the user playlist (either at box 2510 or box 2512), the server will decrease the number of available impressions for this user playlist. This processing is represented by the flow diagram box numbered 2514. The server will next check for any additional users to process, represented by the decision box numbered 2516. If there are additional users, an affirmative outcome, processing returns to the flow diagram box numbered 2504 and the processing of time periods for the next user. If there are no more users to process, a negative outcome at the box 2516, server processing continues, and the playlist and ad files are downloaded to the corresponding users.

As described above, the present invention provides a technique for free Internet access in which an access server sends video advertising files to a user who gains access to the Internet through a network connection having a viewer program that runs with the user's browser to manage download and playback of ads. By downloading the video advertising files when the system detects that the user is not actively using the bandwidth of the Internet connection, the impact on the user's Internet experience is minimized. The viewer program periodically opens a viewer window, on top of the user's browser, and shows ads from the ad pool. When the ad showing is finished, the viewer window is hidden for a quiet interval. At the conclusion of the quiet interval, the viewer window is activated and the next ad showing is performed. In this way, the invention provides Internet content to users for no charge or fee, and also ensures a fresh supply of video ads that will more likely hold the interest and attention of the Internet user.

In accordance with the ad pool display and download management techniques described above, the invention manages a user's "impression seconds" of available viewing time to maximize exposure and minimize network interruption by the intelligent building of an ad inventory, efficient addition, deletion, and cycling of ad files, maintaining a viewer state memory, and performing fraud control.

The present invention has been described above in terms of a presently preferred embodiment so that an understanding of the present invention can be conveyed. There are, however, many configurations for Internet access systems not specifically described herein but with which the present invention is applicable. For example, use of Internet bandwidth may be detected by identifying the occurrence of Internet browser events, such as new links or page download completion. Similarly, ftp-programs and e-mail use can be watched for and avoided. Also, the viewer window control functions can be varied from that shown above. A fully configurable window or a window that pops out on the desktop could be provided, if desired. The present invention should therefore not be seen as limited to the particular embodiments described herein, but rather, it should be understood that the present invention has wide applicability with respect to providing Internet access generally. All modifications, variations, or equivalent arrangements and implementations that are within the scope of the attached claims should therefore be considered within the scope of the invention.

We claim:

1. A method of providing a user computer with access to files of a network, the method comprising:

establishing a communication link from the user computer to an access control system of the network, wherein establishing a communication link includes:

receiving user identification information, verifying demographic information for the identified user stored at the access control system and providing the communication link, collecting demographic information from the user computer in an initial registration and access operation, storing the demographic information at the access control system and identifying it with the registered user, and providing the communication link, and otherwise terminating the communication link and denying network access;

launching a viewer program that controls a status of the communication link;

detecting times when the user is not actively sending or receiving data from the network, and downloading ad files from the network to the user computer during such times, such that the viewer program maintains a pool of ad files at the user computer for display and performs ad pool management tasks;

periodically opening a viewer program window in which a next ad file from the ad file pool is displayed;

hiding the viewer program window after a predetermined number of ad files from the ad file pool have been played and keeping the viewer program window hidden for a predetermined quiet interval;

managing the ad file pool so as to keep track of the number of times each ad file in the ad file pool has been viewed and determine when each ad file in the ad file pool should no longer be viewed;

determining ad impression viewing data corresponding to the number of times each ad file in the ad file pool has been viewed;

determining click through data corresponding to network addresses visited by the user during the viewing of an ad file;

reporting the ad impression viewing data to the access control system;

preparing a Demographic Report that summarizes the reported ad impression viewing data for multiple computer users over a current time period;

comparing an ad file having an associated demographic profile with demographic data for each of multiple registered users and identifying those registered users having demographic information that matches the demographic profile for the ad file;

identifying a time period over which the ad file should be played;

adding the ad file to a playlist for each registered computer user if the ad file is matched to the computer user demographic information and if the identified time period is available for the computer user; and decreasing an available ad file impression number for each identified and matched computer user.

2. A method as defined in claim 1, wherein managing the ad file pool includes determining that an ad file should not be viewed after the ad file has been viewed a predetermined number of times.

3. A method as defined in claim 1, wherein managing the ad file pool includes determining that an ad file should not be viewed after the ad file has been viewed for a predetermined number of calendar days.

4. A method as defined in claim 1, wherein managing the ad file pool includes discarding an oldest ad file from the ad file pool if the ad file pool size exceeds a predetermined size limit value.

5. A method as defined in claim 1, wherein managing the ad file pool includes not tracking an ad file as having been viewed if the viewing of the ad file is prematurely halted before normal completion.

6. A method as defined in claim 1, wherein the viewer program maintains an ad information table of a local database in the user computer.

7. A method as defined in claim 1, further including periodically performing fraud control, wherein the viewer program sends a pulse message to the access control system at predetermined intervals, and the access control system causes the communication link to the network to be severed if it fails to receive an expected pulse message.

8. A method as defined in claim 7, wherein the viewer program maintains an ad information table that includes ad file information initially received from the access control system, such that the viewer program compares actual ad file information determined by the user computer with corresponding ad file information in the table, and such that the access server causes the communication link to the network to be severed if there is a discrepancy.

9. A method as defined in claim 7, wherein the fraud control comprises comparing ad information in the local database with actual ad file information for the corresponding ad file, and indicating fraud if there is a discrepancy.

10. A method as defined in claim 7, wherein the viewer program terminates the network connection if fraud is indicated.

11. A method as defined in claim 1, wherein the access control system includes an Ad server that provides the ad files to a user, a Network Access Server that assigns a network address for an authorized user, and an Access, Authorization, and Accounting server that determines if authorization should be granted to a user.

12. A method as defined in claim 1, further including:

determining ad impression viewing data corresponding to the number of times each ad file in the ad file pool has been viewed;

determining click through data corresponding to network addresses visited by the user during the viewing of an ad file; and reporting the ad impression viewing data to the access control system.

13. A method as defined in claim 1, further including storing state information for the viewing program at the user computer.

14. A method as defined in claim 1, wherein the viewer program displays closed captioning information.

15. A method as defined in claim 1, wherein the viewer program tracks the number of online network access sessions by the user computer.

16. A method as defined in claim 1, wherein the viewer program tracks the time spent online with network access by the user computer.

17. A method as defined in claim 1, further including providing the Demographic Report to a computer user identified as an ad file sponsor.

18. A method as defined in claim 1, wherein the Demographic Report includes demographic report fields that are selected by the computer user.

19. A method as defined in claim 1, wherein providing the Demographic Report includes providing archival reports for prior time periods.

* * * * *